United States Patent
Raag

(10) Patent No.: US 11,687,091 B2
(45) Date of Patent: Jun. 27, 2023

(54) VISUAL LOCALIZATION AND MAPPING IN LOW LIGHT CONDITIONS

(71) Applicant: STARSHIP TECHNOLOGIES OU, Tallinn (EE)

(72) Inventor: Rasmus Raag, Tallinn (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 0 days.

(21) Appl. No.: 16/857,083

(22) Filed: Apr. 23, 2020

(65) Prior Publication Data

US 2020/0341473 A1    Oct. 29, 2020

Related U.S. Application Data

(63) Continuation of application No. PCT/EP2018/079724, filed on Oct. 30, 2018.

(30) Foreign Application Priority Data

Nov. 2, 2017 (EP) ..................... 17199772

(51) Int. Cl.
*G05D 1/02* (2020.01)
*G01C 21/00* (2006.01)
(Continued)

(52) U.S. Cl.
CPC ....... *G05D 1/0274* (2013.01); *G01C 21/3407* (2013.01); *G01C 21/3815* (2020.08);
(Continued)

(58) Field of Classification Search
CPC .. G05D 1/0212; G05D 1/0238; G05D 1/0257; G05D 2201/0213; G05D 1/0274; G05D 1/0246; G01C 21/3815; G01C 21/3833; G01C 21/3407; G01C 22/00; G01C 21/005; G01C 21/20; G01S 19/42; G01S 19/52; G01S 19/53; G06K 9/00664;
(Continued)

(56) References Cited

U.S. PATENT DOCUMENTS

| | | |
|---|---|---|
| 4,549,841 A | 10/1985 | Ishige |
| 5,664,928 A | 9/1997 | Stauber |

(Continued)

FOREIGN PATENT DOCUMENTS

| | | | |
|---|---|---|---|
| WO | 2017076928 A1 | 5/2017 |
| WO | 2017076929 A1 | 5/2017 |

(Continued)

OTHER PUBLICATIONS

Davison, Andrew; Reid, Ian, MonoSLAM: Real-Time Single Camera SLAM, 2007, IEEE, vol. 29, pp. 1052-1065 (Year: 2007).*
(Continued)

*Primary Examiner* — Aniss Chad
*Assistant Examiner* — Chase L Cooley
(74) *Attorney, Agent, or Firm* — Siritzky Law, PLLC

(57) ABSTRACT

A method comprises generating a map comprising day-time features and night-time features, wherein the position of night-time features relative to the day-time features is determined by at least one image captured during twilight. The invention also relates to a corresponding processing unit configured to execute such a method.

20 Claims, 10 Drawing Sheets

(51) Int. Cl.
| | | |
|---|---|---|
| *G01C 21/34* | (2006.01) | |
| *G01C 22/00* | (2006.01) | |
| *G01S 19/42* | (2010.01) | |
| *G01S 19/52* | (2010.01) | |
| *G01S 19/53* | (2010.01) | |
| *G06V 10/48* | (2022.01) | |
| *G06V 10/762* | (2022.01) | |
| *G06V 10/44* | (2022.01) | |
| *G06V 20/00* | (2022.01) | |
| *G06V 20/10* | (2022.01) | |
| *G06F 18/23* | (2023.01) | |
| *G06V 20/58* | (2022.01) | |

(52) U.S. Cl.
CPC ..... *G01C 21/3833* (2020.08); *G01C 21/3848* (2020.08); *G01C 22/00* (2013.01); *G01S 19/42* (2013.01); *G01S 19/52* (2013.01); *G01S 19/53* (2013.01); *G05D 1/0212* (2013.01); *G05D 1/0238* (2013.01); *G05D 1/0257* (2013.01); *G06V 10/44* (2022.01); *G06V 10/48* (2022.01); *G06V 10/762* (2022.01); *G06V 20/00* (2022.01); *G06F 18/23* (2023.01); *G06V 20/10* (2022.01); *G06V 20/584* (2022.01)

(58) Field of Classification Search
CPC .............. G06K 9/4633; G06K 9/6218; G06K 9/00825; G06K 9/00624; G06K 9/4604
See application file for complete search history.

(56) References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 7,073,634 | B2 | 7/2006 | Mitchell et al. |
| 7,320,289 | B1 | 1/2008 | Clarke et al. |
| 7,894,939 | B2 | 2/2011 | Zini et al. |
| 7,931,431 | B2 | 4/2011 | Benedict et al. |
| 8,010,230 | B2 | 8/2011 | Zini et al. |
| 8,104,601 | B2 | 1/2012 | Hayduchok et al. |
| 8,204,624 | B2 | 6/2012 | Zini et al. |
| 8,485,285 | B2 | 7/2013 | Ferrigni |
| 8,874,360 | B2 | 10/2014 | Klinger et al. |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,373,149 | B2 | 6/2016 | Abhyanker |
| 9,557,740 | B2 | 1/2017 | Crawley |
| 9,561,941 | B1 | 2/2017 | Watts |
| 9,694,976 | B1 | 7/2017 | Wurman et al. |
| 9,844,879 | B1 | 12/2017 | Cousins et al. |
| 2003/0165373 | A1 | 9/2003 | Felder et al. |
| 2005/0207876 | A1 | 9/2005 | Springwater |
| 2006/0237239 | A1 | 10/2006 | Bruner et al. |
| 2012/0090110 | A1 | 4/2012 | Van Den Berg et al. |
| 2013/0110281 | A1 | 5/2013 | Jones et al. |
| 2013/0332021 | A1 | 12/2013 | Goren |
| 2014/0136414 | A1 | 5/2014 | Abhyanker |
| 2014/0254896 | A1 | 9/2014 | Zhou et al. |
| 2014/0365258 | A1 | 12/2014 | Vestal et al. |
| 2015/0006005 | A1 | 1/2015 | Yu et al. |
| 2015/0045945 | A1 | 2/2015 | Zini et al. |
| 2015/0100152 | A1 | 4/2015 | Trevino et al. |
| 2015/0183581 | A1 | 7/2015 | Worsley |
| 2015/0379468 | A1 | 12/2015 | Harvey |
| 2016/0185466 | A1 | 6/2016 | Dreano, Jr. |
| 2016/0207710 | A1 | 7/2016 | Conrad et al. |
| 2016/0325928 | A1 | 11/2016 | Lepek et al. |
| 2016/0355337 | A1 | 12/2016 | Lert et al. |
| 2016/0368464 | A1 | 12/2016 | Hassounah |
| 2017/0017237 | A1 | 1/2017 | Tokuyama et al. |
| 2017/0100837 | A1 | 4/2017 | Zevenbergen et al. |
| 2017/0185853 | A1 | 6/2017 | Yokota et al. |
| 2017/0220981 | A1 | 8/2017 | Shucker et al. |
| 2017/0267452 | A1 | 9/2017 | Goren et al. |
| 2018/0020896 | A1 | 1/2018 | High et al. |
| 2018/0349834 | A1 | 12/2018 | Heinla et al. |

FOREIGN PATENT DOCUMENTS

| | | |
|---|---|---|
| WO | 2011035839 | 12/2018 |
| WO | 2016085717 | 12/2018 |

OTHER PUBLICATIONS

Bosse, Michael; Rikoski, Richard; Leonard, John; Teller, Seth, Vanishing Point and 3D Lines from Omnidirectional Video, 2002, IEEE, pp. 513-514 (Year: 2002).*

Kaneko, Kenji; Kanehira, Fumio; Kajita, Shuuji; Hirukawa, Hirohisa; Kawasaki, Toshikazu; Hirata, Masaru; Akachi, Kazuhiko; and Isozumi, Takakatsu, Humanoid Robot HRP-2, 2004, IEEE, pp. 1087 (Year: 2004).*

National Weather Service, Definitions of Twilight, 2016, National Oceanic and Atmospheric Administration, pp. 1 (Year: 2016).*

Johns, Edward; Yang, Guang-Zhong, Feature Co-Occurrence Maps: Appearance-based Localisation Throughout the Day, 2013, IEEE, pp. 3212-3218 (Year: 2013).*

Sharma, Mamta; A Review: Image Fusion Techniques and Applications; 2016; International Journal of Computer Science and Information Technologies, vol. 7; 1082 (Year: 2016).*

Baker: "Automated Street Crossing for Assistive Robots" Proceedings of the 2005 IEEE, Jun. 28-Jul. 1, 2005.

Jeniece Pettitt: "Forget-delivery-drones-meet-your-new-delivery-robot", Nov. 2, 2015 (Retrieved from the Internet: URL: https://www.cnbc.com/2015/11/02/forget-delivery-drones-meet-your-new-delivery-robot.html).

Anonymous: "Lieferroboter Starship: "Klauen wurde ich ihn nicht"—Auto—Tagesspiegel",Nov. 29, 2015 (Retrieved from the Internet: URL: http://www.tagesspiegel.de/mobil/lieferroboter-starship-klauen-wuerde-ich-ihn-nicht/12647114.html) and English translation.

P. Nelson, W. Churchill, I. Posner and P. Newman, "From dusk till dawn: Localization at night using artificial light sources," 2015 IEEE International Conference on Robotics and Automation (ICRA), Seattle, WA, 2015, pp. 5245-5252, May 2015.

Johns Edward et al, "Feature Co-occurrence Maps: Appearance-based localisation throughout the day", May 6, 2013 (May 6, 2013), p. 3212-3218, May 6, 2013.

Marina Magnabosco et al, "Cross-spectral visual simultaneous localization and mapping (SLAM) with sensor handover", Robotics and Autonomous Systems.,vol. 61, No. 2, Feb. 1, 2013 (Feb. 1, 2013), p. 195-208.

WIPO, (IB/373) International Preliminary Report on Patentability Chapter I, PCT/EP2018/079724, dated May 5, 2020, 6p.

WIPO, (ISA/210) International Search Report, PCT/EP2018/079724,dated Sep. 5, 2019, 4p.

WIPO, (ISA/237) Written Opinion of the International Searching Authority, PCT/EP2018/079724, dated Sep. 5, 2019, 5p.

Amended claims filed after receipt of (European) search report, filed in EPO for EP 18795612.3 by Applicant (dated Jan. 7, 2021).

Amended claims with annotations, filed in EPO for EP 18795612.3 by Applicant (Jan. 7, 2021).

Amendments received before examination, filed in EPO for EP 18795612.3 by Applicant (dated Jan. 7, 2021).

Letter accompanying subsequently filed items, filed in EPO for EP 18795612.3 by Applicant (Jan. 7, 2021).

\* cited by examiner

VISUAL LOCALIZATION AND MAPPING IN LOW LIGHT CONDITIONS

RELATED APPLICATIONS

This application is a continuation of PCT/EP2018/079724, filed Oct. 30, 2018, which claims priority from European Patent Application 17199772.9, filed Nov. 2, 2017, the entire contents of each of which are hereby fully incorporated herein by reference for all purposes.

The present invention relates generally to localizing a mobile robot on a map and creating the map. The invention also relates to a robot configured to carry out such methods.

Autonomous land-based mobile robots have become an active area of research. The trend is to make such robots drive autonomously or partially autonomously in pedestrian walkways or in road streets, or in both pedestrian walkways and road streets as well as other indoor and outdoor environments. These robots can for example be mobile delivery robots that can deliver goods from a starting point to their respective destination. Such a mobile robot should have the ability to complete its tasks irrespectively of the light conditions of the environment, be it during the day, evening or night.

For such a task of autonomous or partially autonomous driving of mobile robots, among others, it is advantageous that the mobile robots have a method of at least estimating their position in space so that they can continue completing their tasks. To estimate its position, the robot must use some sort of map on which it can place itself. Such a map can be preloaded on a robot, or it can be obtained by the robot itself. In the latter case, the map can be obtained simultaneously with the robot localization by the robot (often referred as Simultaneous Localization and Mapping, SLAM), or the map can first be developed to be used later as part of localization.

Current state of the art that addresses such a topic includes the use of combined data from various sensors, such as cameras, GPS, odometers, etc. Visual features detected from camera images are matched to mapped data to infer robot location and orientation. If no map is available, a map can be created from the detected visual features and the features can be distilled to other forms for mapping, e.g. a three-dimensional location of an object can be triangulated from detected visual features that are thought to be multiple observations of a single underlying real-world object. However, such visual features can efficiently be extracted from the environments using conventional cameras typically during the day in good light conditions. Most of typical cameras do not perform well on low light conditions, such as during the evenings or during the night, and thus most of the visual features extracted from the environment are not reliable enough to be used for the process of localization or mapping of the mobile robot.

As regards localization at night, there is also an article by P. Nelson, W. Churchill, I. Posner and P. Newman, "From dusk till dawn: Localization at night using artificial light sources," 2015 IEEE International Conference on Robotics and Automation (ICRA), Seattle, Wash., 2015, pp. 5245-5252. This article suggests to use artificial lighting for the localization during the night.

While the discussed prior art may be satisfactory in some instances, it has certain drawbacks and limitations. In particular, with the above article it is not (or only to a very limited extend) possible to create a night map with little additional effort, i.e., with high efficiency.

In light of the above, it is an object of the present invention to overcome or at least alleviate the shortcomings and disadvantages of the prior art. In particular, it is an object of the present invention to generate a map configured for navigation during the night with little effort, i.e., in an efficient manner. These objects are met by the present invention.

The present invention is specified in the claims as well as in the below description. Preferred embodiments are particularly specified in the dependent claims and the description of various embodiments.

In a first embodiment, the invention provides a method comprising generating a map comprising day-time features and night-time features. The position of night-time features relative to the day-time features is determined by at least one image captured during twilight.

Thus, a map may be generated comprising both day-time features and night-time features. That is, there may be provided a map (i.e., a two or three-dimensional data set) that may be used both during daytime and during night-time. The creation of the map may be particularly simple and efficient. In particular, only one map may be created by determining the relative positions of night-time features and day-time features during twilight. Put differently, instead of having to create a daytime map and a night-time map, one "universal" map may be created by registering the relative positions of features visible during day time and during night-time at twilight, when at least some of the daytime features and at least some of the night-time features are visible. This may be a particularly efficient process to generate the map having both day-time features and night-time features.

In some embodiments, the method can further comprise capturing at least one image during twilight. This can be advantageous as the image taken at twilight can be used to determine the position of night-time features relative to the day-time features. An image taken at twilight time can be advantageous since the light condition during twilight allows for both (at least some of) the night-time features and (at least some of) the day-time features to be visible and easily detectable on an image.

In some embodiments, the method can comprise extracting visual features from at least one image captured during twilight. The visual features extracted from the image can comprise straight lines (also referred as twilight straight lines to emphasize the fact that they are extracted from an image captured during twilight). The visual features extracted from the image taken at twilight can further comprise urban lights (also referred to as twilight urban lights to emphasize the fact that they are extracted from an image captured during twilight). In such embodiments, commonality can exist between twilight straight lines and day-time features as well as between twilight urban lights and night-time features. That is, the straight lines seen at twilight can be similar with the straight lines (or in general with day-time features) seen during the day, i.e., some of the twilight straight lines may coincide with the day-time features. Additionally, urban lights can be switched on during twilight and can be extracted from images taken during twilight and can coincide with the urban lights (or in general with the night-time features). Having different types of visual features, such as the straight lines and the urban lights, in one image can be advantageous as it can provide an accurate positioning of the straight lines relative to the urban lights (or the urban lights relative to the straight lines). Furthermore, straight lines may be a reliable and reproducible feature for mapping and localization.

In some embodiments, the commonality between the twilight straight lines and the day-time features can be used to align the twilight visual features with day-time features. That is, on an image captured at twilight straight lines can be extracted. Due to the relatively good light conditions the twilight straight lines can coincide with the day-time features, more particularly with straight lines extracted from the image taken during the day. This can be advantageous, especially if information regarding the position (such as the position in the real world or position on a map) of the day-time features is known. Thus, commonality between twilight straight lines and day time features can be used to align twilight straight lines and day time features, which implies that information regarding the position (such as the position in the real world or position on a map) of the twilight straight lines is gained. Even further, the relative position with regard to each other of all the twilight visual features (i.e. the twilight straight lines, the twilight urban lights) extracted from an image taken during twilight time is known, since they can have been extracted from the same image. Thus, the gained information regarding the position (such as the position in the real world or position on a map) of the twilight straight lines implies that information regarding the position (such as the position in the real world or position on a map) of the other twilight visual features, such as twilight urban lights can be implied.

In some embodiments, the commonality between the twilight urban lights and the night-time features can be used to align the twilight visual features with night-time features. That is, on an image captured at twilight, urban lights can be extracted. The urban lights can coincide with the night-time features, more particularly with urban lights extracted from the image taken during the night. This can be advantageous, especially if information regarding the position (such as the position in the real world or position on a map) of the night-time features is known. Thus, commonality between twilight urban lights and night-time features can be used to align twilight urban lights and night-time features, which implies that information regarding the position (such as the position in the real world or position on a map) of the twilight urban lights is gained. Even further, the relative position with regard to each other of all the twilight visual features (i.e. the twilight straight lines and the twilight urban lights) extracted from an image taken during twilight time is known, since they can have been extracted from the same image. Thus, the gained information regarding the position (such as the position in the real world or position on a map) of the twilight urban lights implies that information regarding the position (such as the position in the real world or position on a map) of the other twilight visual features, such as twilight straight lines, can be inferred.

In some embodiments, the map comprising day-time features and night-time features can be generated by adding twilight visual features to the provided map. That is, for example, a map may be provided comprising day-time features which provide information regarding the position (such as the position in the real world or position on the map) of the day-time features. As described above, the similarity between twilight visual features (more particularly the twilight straight lines) and day-time visual features can be used to obtain information regarding the position (such as the position in the real world or position on the map) of the twilight visual features. Thus, the twilight visual features can be added to the map. Since the twilight visual features, more particularly twilight urban lights, and night-time visual features can comprise commonalities, a map comprising day-time features and night-time features can be generated.

Such a map can be advantageous as it can be used both during daytime and night time with less mapping effort than would be if not "merging" the maps, i.e. comprising a map for daytime and a map for use at night time, that is, comprising a map with daytime features on it and another map with night time features on it.

In a similar manner the twilight visual features can be added to a map, wherein the map can comprise nigh-time visual features. That is, a map may be provided comprising night-time features which provide information regarding the position (such as the position in the real world or position on the map) of the night-time features. The similarity between twilight visual features (more particularly the twilight urban lights) and night-time visual features comprised by the map can be used to obtain information regarding the position (such as the position in the real world or position on the map) of the twilight visual features. Thus, the twilight visual features can be added to the map. Since the twilight visual features, more particularly twilight straight lines, and day-time visual features can comprise commonalities, a map comprising day-time features and night-time features can be generated.

Again, similarly a map comprising day-time features and night-time features can be generated by adding twilight visual features to a provided map, and wherein the map does not necessarily comprise visual features, such as day-time features and night time features at the beginning of the process. Twilight visual features can be added to the map, if the position, such as the position in the real world or position on the map, of the twilight visual features can be known. In one example, the twilight visual features are added to the map by a mobile robot through a simultaneous localization and mapping method (SLAM).

Since the twilight visual features can comprise at least some of the day-time features and at least some of the night-time features, adding twilight visual features to a provided map can result in a map comprising both (at least some of) day-time features and (at least some of) night-time features.

That is, to generate a map comprising day-time features and night-time features, twilight visual features can be added to the map. It may be particularly efficient to use the twilight visual features since they can comprise both day-time features (such as straight lines) and night-time features (such as the urban lights) or at least some of the day-time features and some of the night-time features. Furthermore, in an image taken at twilight the straight lines and the urban lights can appear together (i.e. are visible enough to be identified and extracted). This can provide an accurate relative position between the twilight straight lines and twilight urban lights, since they can appear in the same image. The accuracy of the relative position between visual features appearing in the same image can be determined, for example, by the resolution of the image, such as the number of pixels on the image, or by the algorithm used to extract the visual features from the image. However, the relative position with respect to each other of the visual features extracted from the same image is not influenced by the localization of the position where the image was captures. Thus, detecting day-time features, such as the straight lines, and night-time features, such as the urban lights, on the same image provides an efficient manner for determining the relative position of such features with respect to each other.

Furthermore, by detecting similarity between the twilight visual features extracted from the image captured during twilight and the day-time features on a provided map, the position of the twilight visual features on the map can be determined. Since during twilight most of (or at least some of) the day-time features are visible and can be detected, many or at least some common features can be found between the twilight visual features and the visual features provided on the map. Thus, an accurate position of the common features can be determined as it is provided on the map (it can be assumed that the information provided on the map is accurate) and as a result the twilight visual features extracted from the same image as the common features, can be determined.

In some embodiments, visual features related to a location can be added to the map by capturing at least one image on the location. Further, visual features or characteristics of the location can be extracted from the at least one image. Such visual features can, for example, be straight lines that can belong to buildings, fences, sidewalks. The visual features can also be urban lights, such as artificial light sources, street lights, illuminated signs or illuminated windows. Further, the location wherein the image is captured can be estimated and such location can be associated to the visual features. The visual features associated with information regarding their position (such as the position in the real world or position on the map) can be added to the map. Adding visual features to a map can be advantageous as it facilitates the creation of a map comprising visual features. For example, a map comprising daytime features can be created as well as a map comprising night time features or both daytime features and night time features. Furthermore, adding visual features to a map can be advantageous as it facilitates the process of merging maps comprising daytime features with maps comprising night time features.

In some embodiments, the visual features added to the map can comprise daytime features. The day-time features can comprise visual features extracted from an image captured during day time or during good light conditions. The day-time features can comprise patterns on a day-time image that have a substantially straight line. For example, they may belong to road endings, sides of buildings, sides of signs, fences. Adding daytime features to a map can be advantageous as it facilitates the creation of a map comprising daytime features. It can also be advantageous as it facilitates or improves the accuracy of localization using the map and the daytime features, especially during good light conditions, such as during the day.

In some embodiments, the visual features added to the map can comprise night-time features. The night-time features can comprise visual features extracted from an image captured during night time or during low light conditions. The night-time features can comprise urban lights, such as artificial light sources, street lights, illuminated signs or illuminated windows. Adding night-time features to a map can be advantageous as it facilitates the creation of a map comprising night-time features. It can also be advantageous as it facilitates or improves the accuracy of localization using the map and the night-time features, especially during low light conditions, such as during the night.

In some embodiments, the visual features added to the map can comprise twilight visual features. The twilight visual features can comprise visual features extracted from an image captured during twilight. The twilight visual features can comprise twilight straight lines and twilight urban lights. The twilight visual features can comprise visual features that can be similar to the daytime visual features. The twilight visual features can comprise visual features that can be similar to the night-time visual features. Adding twilight visual features to a map can be advantageous as it facilitates the creation of a map comprising twilight visual features, or visual features that coincide with daytime features and night-time features. It can also be advantageous as it facilitates or improves the accuracy of localization using the map and the twilight visual features. Further, adding twilight visual features to a map may facilitate the process of merging a map comprising daytime features with a map comprising night-time features. In addition, it facilitates the process of adding night-time features to a map comprising daytime features, as well as adding daytime features to a map comprising night-time features.

In some embodiments, an estimation of the location is facilitated by comparing visual features extracted from at least one image captured on the location with visual features comprised by the map used to estimate the location. That is, a map comprising visual features is used for localization. Information regarding the position (such as the position in the real world or position on the map) of the visual features comprised by the map is known (such information can be present on the map). For the sake of localization an image of the surrounding on the location can be obtained and visual features can be extracted from such images. Further, a comparison of the extracted visual features from the obtained image and the visual features on the map can be done. If similarity between the visual features is found then the known information regarding the position (such as the position in the real world or position on the map) of the visual features comprised by the map can be used to infer the position of the location where the image was captured.

In some embodiments, the estimation of the location is facilitated by at least one or any combination of at least one GPS sensor, at least one dead-reckoning sensor, at least one accelerometer, at least one gyroscope, at least one time of flight camera, at least one Lidar sensor, at least one odometer, at least one magnetometer, and at least one altitude sensor.

That is, in order to add visual features to a map, the approximate location where such visual features belong to may be determined beforehand. For example, on a particular location an image can be captured. However, the map where the visual features are to be added does not necessarily have to be only regarding the particular location. That is, it can be a map of a particular area, neighborhood, city, state or even the whole world. Thus, to solve the ambiguity related to which position in the map or in the real world the visual features that need to be added to the map belong to, at least one or a combination of sensors can be used, such as for example GPS sensor. Further, the visual features extracted from an image on location can be compared to visual features provided on the map. If some common features are found by said comparison, then the location of the common features can be determined (since it is provided in the map) and as a result the location of the other visual features extracted from the image can be determined too. Because visual data provide an accurate localization method, the visual features can be accurately added to the map.

In some embodiments, the day-time features can comprise a plurality of straight lines. The straight lines can be extracted from patterns on an image that have a shape of substantially straight line. Such straight-line patterns may belong, for example, to road endings, sides of buildings, sides of signs, fences or sidewalks. The straight lines can be advantageous as they can be substantially easily extracted from an image, especially during day time or in general during good light conditions.

In some embodiments, the straight lines can be extracted from an image by applying an edge detector algorithm on the image, such as for example the Canny algorithm. Also, other edge detector algorithms can be used to facilitate the extraction of straight lines from an image. Further, the extraction of straight lines from an image can be facilitated by applying a line extracting algorithm on the results of the edge detector algorithm. An example of a line detecting algorithm can be the Hough transform. Also, other line detector algorithms can be used to facilitate the extraction of straight lines from an image. In some embodiments, a line detector algorithm configured to extract patterns on an image with a substantially straight-line shape, can be applied directly on an image to extract straight lines from that image.

In some embodiments, the night-time features can comprise urban lights. The urban lights can belong to switched-on artificial light sources such as for example street lights, illuminated signs or illuminated windows. In some embodiments, the urban lights can be extracted from at least one image by detecting stationary bright spots. The stationary bright spots can be advantageous as they can belong to stationary or permanent objects in the real world and thus can be used as reference for localization. Further, the urban lights can be advantageous as they can appear on images, especially on images taken at low light conditions, as bright spots and can thus be easily identified or extracted from that image. An exemplary method for extracting or identifying the bright spots, i.e. urban lights, on an image can be brightness thresholding.

The night-time features may comprise night-time straight lines. Straight lines, and also the straight lines detectable during the night, may be a very reliable and stable information that can facilitate mapping and subsequent localization.

In some embodiments of the first embodiment, the method can be used as a Simultaneous Localization and Mapping (also abbreviated as SLAM) method. That is, localization and mapping is performed simultaneously, i.e. map data is created at the same time while information regarding the position (such as the position in the real world or position on the map) is gained. Simultaneous Localization and Mapping can be advantageous as it facilitates the creation (or update or improvement) of maps regarding a location while at the same time localization is performed.

In some embodiments, the twilights can be defined by the sun being located between 0° and 18° below the horizon (which can be referred as astronomical twilight), preferably between 0° and 12° below the horizon (which can be referred as nautical twilight), such as between 0° and 6° below the horizon (which can be referred as civil twilight). It will be understood that all the degrees provided herein typically refer to the center of the sun.

In some embodiments, the day-time features can be features or characteristics or visual features that are visible on (or that can be identified on or extracted from) images captures during daytime. Daytime can be defined by the sun being located above the horizon.

In some embodiments, night-time features are features that are visible on (or that can be identified on or extracted from) images captured during night-time. Night-time can be defined by the sun being located more than 6°, preferably more than 12°, such as more than 18° below the horizon.

In some embodiments, at least one twilight straight line is added to the map, this adding comprises downsizing the at least one image captured during twilight to generate a downsized twilight image, and determining the at least one twilight straight line by means of the downsized twilight image.

In some embodiments, at least one straight line is added to the map, and this adding comprises downsizing at least one image captured during daytime to generate a downsized daytime image, and determining the at least one straight line by means of the downsized daytime image.

In some embodiments, at least one night-time straight line is added to the map, and this adding comprises downsizing at least one image captured during night-time generate a downsized night-time image, and determining the at least one night-time straight line by means of the downsized night-time image.

To detect a line from an image (e.g., the straight line or the twilight straight line), the color and/or intensity of pixels may be used. E.g., to detect a line, the color and/or intensity on one side of the line typically is sufficiently different from that of the pixels on the other side, and the transition between the two kinds of pixels ideally is quite sudden. If instead of the sudden change there is a slow gradient change, it may be more difficult to detect a line. In such instances, parallel to the normal line detection process, a line detection on downscaled images may be used. That is, one may resize the image to be smaller and try to detect lines there. Some of the previously too blurry lines will become sharper with resizing, so one can detect them. Another type of line that is more easily detected on downscaled images is the jagged line. A typical example of this is a road edge or sidewalk edge, which can be a zig-zag instead of a perfect line. Downscaling the image makes those small imperfections disappear and one can detect a line that is generally straight in such a downsized image more easily.

Because one detects the low-resolution lines from a downscaled image, one does not know precisely where they would appear on the original image. For example, if a line detector would detect lines with one-pixel precision, then if used on a 3× smaller image, the detected line location on the original image would be known with a 3-pixel precision.

In general, such "low resolution lines" are less precise and thus less useful. However, low resolution lines are often edges of large objects, such as roads, so they can be quite useful to at least a somewhat accurate localization solution even if there are not enough high-resolution lines. Low light conditions typically produce few high-resolution lines, not just because of lack of visible lines, but also because the motion blur in the images due to the increased camera exposure time. This means that low resolution lines can be quite useful, especially also during twilight and during the night.

In some embodiments, the map further comprises information regarding the relative position of the night-time visual features and day-time visual features relative to the Earth, such as, relative to any of the center of the Earth, Equator and Prime meridian. That is, the visual features comprised in the map, are features extracted from a certain location. Information regarding the relative position of this location and the Earth can be comprised by the map. ISO 6709 Standard Representation of Geographic Point Location by Coordinates can be used to represent the relative position of the night-time visual features and day-time visual features relative to the Earth.

In some embodiments, the map further comprises information related to the position of any of the roads and buildings of a location. In some embodiments, the map comprises information regarding the relative position of the roads and building relative to the day-time features and night-time features. That is, the map can comprise a representation of the roads and/or buildings of the mapped area, associated with their position on the area and/or relative position of the roads and/or building relative to day-time features and night-time features. Further the roads and the buildings can be associated with tags, that can represent for example the name of the road, address of a building. The information related to the position of any of the roads and buildings of a location can be advantageous as it can facilitate the localization using said map.

In some embodiments, the generation of a map comprising day-time features and night-time features can be facilitated by a mobile robot driving at a location and extracting any of day-time features and night-time features from images captured at that location.

In some embodiments, one or more mobile robot can drive at one or more locations and can generate a map comprising day-time features and night-time features of each location.

In some embodiments, a map of a location can be extended with a map of another location if the relative position between the first and the second location is known.

In some embodiments, a map of a location can be extended with a map of another location if the maps overlap each other, such that, the maps comprise common visual features.

Embodiments of the present invention also relate to a method for mapping features, the method comprising: based on at least one image comprising the features, generating a first hypothesis for locations of the features by taking into account a subset of the features; and generating a second hypothesis for locations of the features by taking into account the first hypothesis and features that are not included in the subset of features, and mapping the features according to the second hypothesis.

The subset of features may not comprise features comprising a cluster characteristic below a cluster threshold. That is, the subset of features may only comprise features comprising a cluster characteristic above or equal to a cluster threshold. In other words, a feature may be part of a cluster if the cluster characteristic is below a cluster threshold value.

The cluster characteristic may be a minimum pixel distance of a feature to another feature and the cluster threshold may be a pixel threshold.

Thus, a feature may be considered part of a cluster if the pixel distance to the closest feature is below a cluster threshold expressed in pixels. It should be understood that minimum pixel distance denotes the pixel distance of a feature to the closest other feature.

The cluster characteristic may be a minimum angular distance of a feature to another feature and the cluster threshold may be an angle threshold. The angular distance between two features can be defined as the angle between a vector from an origin and directed towards the first feature and another vector from the same origin and directed towards the other feature. The origin (wherein the vectors or lines to the features co-originate or intersect) can be the center of the camera that captures the image wherein the features are extracted.

That is, a feature may be considered part of a cluster if the smallest angle of all angles created between a vector directed towards the feature and the other vectors directed toward the other features, is below a cluster threshold angle, wherein all vectors originate at the same origin, such as, the center of the camera that captures the image from which features are extracted.

The cluster characteristic may be a minimum real-world distance between the physical object corresponding to a feature and the physical object corresponding to another feature and the cluster threshold may be a real-world distance threshold. It will be understood that the real-world distance is typically the Euclidean distance.

That is, a feature may be considered part of a cluster if the distance in the real world between the corresponding physical object and the closest physical object for which a feature is extracted is below a cluster threshold value.

The features may be point features, such as light sources.

The method for mapping features may also comprise iteratively generating additional hypotheses, wherein for each hypothesis n, the hypothesis n is generated by taking into account hypothesis n−1 and features that are not included in a subset of the features for the hypothesis n−1. That is, the above described rationale of first creating a first hypothesis by only taking into account some features and then expanding the features that are taken into account to create a second hypothesis may also be employed iteratively. When performing such iterations, any hypothesis typically takes into account the previous hypothesis and an expanded set of features.

In some embodiments employing a cluster threshold, the cluster threshold may be iteratively lowered for the additional hypotheses. That is, each hypothesis (except for the first hypothesis) may be generated by taking into account the previous hypothesis and a set of features defined by the features being equal to or exceeding a cluster threshold, wherein the cluster threshold becomes increasingly smaller. Thus, in each iteration, fewer features are excluded and more features are considered than in the previous iteration.

That is, embodiments of the present invention also relate to creating a map comprising features (e.g., adding the features to a pre-existing map) in a two-step process. In a first "coarse" step, features are added to a map. In this first step, for determining the location of the features (and to thus add these features "correctly" to the map), only a sub-set of features is taken into consideration, while other features are disregarded. Consider, e.g., the situation of mapping night features such as light sources. Such light sources emitting light may be present on an image (or a plurality of images) captured by a robot. These light sources may be distributed on the image. Thus, relatively isolated light sources (i.e., features) may exist and light sources may be arranged at a high density, i.e., in a cluster. Based on the light sources (or, more generally, the features) arranged in clusters, it may be more difficult to arrive at correct conclusions, as there may be different possible configurations of such light sources that may result in similar images. In light thereof, embodiments of the present technology employ a two-stage process (or generally, a multi-stage process, as additional steps are not prohibited) for the mapping process. In a first "coarse" step, the clustered features may be disregarded. Thus, in this first step, one already arrives at an initial hypothesis for the location of the features. Then, in a second step, this hypothesis is refined by also taking into account the clustered features. Thus, all features may be taken into account for mapping of the features, thus arriving at results that may be more valid compared to not taking into account the clustered features, while also allowing for an efficient computation, as the clustered features are only taken into account after generating the first hypothesis.

Further embodiments of the present invention also relate to a method for mapping features, the method comprising: based on at least one image comprising the features, assigning a weight to each of the features, wherein the weights are different for at least two features; and based on the weights assigned to the features, generating a hypothesis for locations of the features, and mapping the features according to the hypothesis.

It will be understood that the weights assigned to the at least two features may typically be non-zero.

The features may be line segment features and/or point features, such as light sources.

The weight assigned to each feature may depend on a minimum distance of the respective feature to another feature.

The minimum distance may be a minimum pixel distance.

The minimum distance may be a minimum angular distance, i.e. the angle between the two directions (or vectors) originating from an origin, such as, the observer point (e.g. center of the camera) and pointing towards the two features.

The minimum distance may be a minimum real-world distance of the physical object corresponding to the respective feature to the physical object corresponding to another feature.

A greater weight may be assigned to a first feature having a greater minimum distance to another feature than to a second feature having a smaller minimum distance to another feature.

A weight function for the features that depends on the minimum distance to another feature may be monotonically increasing with increasing minimum distance to another feature.

The weight function may be strictly increasing with increasing minimum distance to another feature.

That is, generally, features may be assigned different weights when a map is created by using these features. Generally, features may thus have a differing impact on the map that is created (i.e., on where individual features will be located on the map). In particular, a lower weight may be assigned to features being close to one another (including features that are arranged in clusters). Again, as described above, for features that are located close to one another, there may be different options of creating hypotheses that fit them well (making such features less advantageous for map creation than other features). Thus, more isolated features may yield more reliable results than features that are arranged in clusters. Thus, the present technology may arrive at results superior to the results that would be generated by assigning the same weight to every feature.

Further embodiments of the present invention also relate to a method of localizing an object, the method comprising: based on at least one image comprising features, generating a first localization hypothesis for a location of an object by taking into account a subset of the features; and generating a second localization hypothesis for the location of the object by taking into account the first localization hypothesis and features that are not included in the subset of features, and localizing the object according to the second localization hypothesis.

The subset of features may not comprise features comprising a cluster characteristic below a cluster threshold. That is, the subset of features may only comprise features comprising a cluster characteristic above or equal to a cluster threshold. In other words, a feature may be part of a cluster if the cluster characteristic is below a cluster threshold value.

The cluster characteristic may be a minimum pixel distance of a feature to another feature and the cluster threshold may be a pixel threshold.

Thus, a feature may be considered part of a cluster if the pixel distance to the closest feature is below a cluster threshold expressed in pixels.

The cluster characteristic may be a minimum angular distance of a feature to another feature and the cluster threshold may be an angle threshold. The angular distance between two features can be defined as the angle between a vector from an origin and directed towards the first feature and another vector from the same origin and directed towards the other feature. The origin (wherein the vectors or lines to the features co-originate or intersect) can be the center of the camera that captures the image from which the features are extracted.

That is, a feature may be considered part of a cluster if the smallest angle of all angles created between a vector directed towards the feature and the other vectors directed toward the other features, is below a cluster threshold angle, wherein all vectors originate at the same origin, such as, the center of the camera that captures the image from which features are extracted.

The cluster characteristic may be a minimum real-world distance between the physical object corresponding to a feature and the physical object corresponding to another feature and the cluster threshold may be a real-world distance.

That is, a feature may be considered part of a cluster if the distance in the real world between the corresponding physical object and the closest physical object for which a feature is extracted is below a cluster threshold value.

The features may be point features, such as light sources.

It will be understood that this may have advantages corresponding to the advantages discussed above for the corresponding mapping method. That is, this may allow for a fast and reliable localization of an object (e.g., a robot operating in an environment and capturing images of the environment).

Further embodiments of the present invention also relate to a method of localizing an object, the method comprising: based on at least one image comprising features, assigning a weight to each of the features, wherein the weights are different for at least two features; and based on the weights assigned to the features, generating a localization hypothesis for a location of the object, and localizing the object according to the localization hypothesis.

It will be understood that the weights assigned to the at least two features may typically be non-zero.

The features may be line segment features and/or point features, such as light sources.

The weight assigned to each feature may depend on a minimum distance of the respective feature to another feature.

The minimum distance may be a minimum pixel distance.

The minimum distance may be a minimum angular distance, i.e. the angle between the two directions (or vectors) originating from an origin, such as, the observer point (e.g. center of the camera) and pointing towards the two features.

The minimum distance may be a minimum real-world distance of the physical object corresponding to the respective feature to the physical object corresponding to another feature.

A greater weight may be assigned to a first feature having a greater minimum distance to another feature than to a second feature having a smaller minimum distance to another feature.

A weight function for the features that depends on the minimum distance to another feature may be monotonically increasing with increasing minimum distance to another feature.

The weight function may be strictly increasing with increasing minimum distance to another feature.

Again, it will be understood that this may have advantages corresponding to the advantages discussed above for the corresponding mapping method. That is, this may allow for a more reliable localization method compared to the situation of assigning the same weights to all the features.

Embodiments of the present invention also relate to the combination of the embodiments described before. For example, embodiments of the present invention also relate to a method comprising the method for mapping features as described before and the method of localizing an object as described before.

Further, also the method described before mentioning day-time features and night-time features may be combined with the discussed mapping method and/or with the discussed localization method.

That is, it will be understood that the above described two-step mapping or localization processes (only taking into account a subset of features in a first step, but then also taking features outside of the subset into account in a second step; and the ones assigning different weights to the individual features) may be combined with the process of matching day-time features and night-time features. For example, also in the process of matching night-time and daytime features, in a first step, only a sub-set of features may be matched, and in a second step, also features not present in this sub-set can be matched. Further, also for the process of matching day-time and night-time features, different weights can be assigned in the matching process. Thus, the described methods can also be combined with one another.

In a further embodiment, a processing unit configured to execute the method according to any of the embodiments of the first embodiment is disclosed.

Thus, a processing unit can be configured to generate a map comprising both day-time features and night-time features. In some embodiments, the processing unit can have access to a map comprising day-time features. Further the processing unit can be configured to add night-time features to the map and can determine the relative position of the night-time features with respect to the day-time features by using at least one image taken during twilight. The processing unit can execute the method according to any of the embodiments of the first embodiment in an efficient and fast manner. For example, the method according to any of the embodiments of the first embodiment can be provided to the processing unit in the form of an algorithm written in a computer language. The processing unit can also be advantageous as it can be integrated in larger systems, such as a mobile robot.

In some embodiments, the processing unit can be configured to extract day-time features from an image.

In some embodiments, the processing unit can be configured to extract night-time features from an image.

In some embodiment, the processing unit can be part of a mobile robot and can facilitate the mobile robot's navigation and localization. That is, the mobile robot can comprise a processing unit configured to process images. The processing unit can be a System-on-Chip (SoC), preferably comprising at least one Graphical Processing Unit (GPU) or Central Processing Unit (CPU) or both. The processing unit can be configured to execute an image processing algorithm on images, that can for example be captured by the mobile robot, for extracting visual features from the images. In some embodiments day-time visual features, such as straight lines, can be extracted from the image(s). Such straight lines can be extracted from patterns on the image(s) that have a shape of a substantially straight line. Such straight-line patterns, i.e. straight lines, may belong to road endings, sides of buildings, sides of signs, fences etc. In some embodiments, the visual features extracted from the image(s) can comprise night-time visual features, such as urban lights. The urban lights can comprise any artificial light source captured on the image(s) such as street lights, illuminated signs or illuminated windows.

That is, the present invention proposes using urban lights for autonomous mobile robot navigation, more particularly, for the process of localization and mapping during low light conditions. That is, during the day, or in good lighting conditions, the mobile robot can use straight lines extracted from the surrounding environment, as such lines do not change much during different times of the day or different seasons of the year and thus can be reliable. However, during the night, or in low light conditions, most of the visual features that are visible during the day are not visible any more, or only a few of such features, such as the straight lines extracted from the environment, are visible. Thus, the present invention proposes the use of other visual features during the night. Such visual features that become visible during the night can be artificial light sources, such as street lights, illuminated signs, illuminated windows, etc.

However, the use of other visual features during the night, comes with the cost of the creation of different map data, as the robot will comprise map data created in daylight conditions and map data created in low light conditions. Multiple maps can be merged into one map if similarities between the maps can be detected. However, since such maps use different visual features as proposed by the current invention, there are very few similarities between them.

To solve such issues, the present invention presents a method for merging night maps, or maps created during low light conditions using urban lights, with day maps. The merging of such maps is conducted by using map data extracted at twilight wherein most of the daylight visual features become visible and also the urban lights are still visible.

To sum up, the present invention features the utilization of urban lights at low light conditions for localization and mapping, in conjunction with or independent from other features used for localizations and mapping. Further the present invention presents a method of using mapping data gathered during twilight time, to align map data from daylight time with map data from night time.

In still other words, the present invention generally relates to a mobile robot. More particularly, the invention relates to a mobile robot adapted to use visual information for localization in areas and times of little illumination. Furthermore, it relates to merging the localization maps created from data collected at vastly different levels of illumination. Furthermore, the present invention also relates to the utilization of urban lights at night for localization and mapping, in conjunction with or independently from other features used for localization and mapping, and/or to the use of twilight time to gather mapping data that would help align data from daytime and data from night time.

Below further numbered embodiments of the invention will be discussed.

1. A method comprising:
   generating a map comprising day-time features (1) and night-time features (2),
   wherein the position of night-time features (2) relative to the day-time features (1) is determined by at least one image captured during twilight.

2. A method according to the preceding embodiment, further comprising capturing the at least one image during twilight.

3. A method according to any of the preceding embodiments, further comprising extracting visual features from at least one image captured during twilight wherein the visual features comprise twilight straight lines (1T) and/or twilight urban lights (2T).

4. A method according to the preceding embodiment, wherein commonality exist between
twilight straight lines (1T) and day-time features (1); and
twilight urban lights (2T) and night-time features (2).

5. A method according to the preceding embodiment, wherein the commonality between the twilight straight lines (1T) and the day-time features (1) is used to align the twilight visual features (1T, 2T) with day-time features (1).

6. A method according to any of the preceding embodiments and with the features of embodiment 4, wherein the commonality between the twilight urban lights (2T) and night-time features (2) is used to align the twilight visual features (1T, 2T) with night-time features (2).

7. A method according to the preceding two embodiments, wherein the map comprising day-time features (1) and night-time features (2) is generated by adding twilight visual features (1T, 2T) to an initially provided map.

8. A method according to any of the preceding embodiments, wherein visual features related to a location are added to the map by
capturing at least one image on the location;
extracting visual features from the at least one image;
estimating the location and associating the location to the visual features; and
adding the visual features associated with respective location to the map.

9. A method according to the preceding embodiment, wherein the visual features added to the map comprise day-time features (1).

10. A method according to any of the preceding embodiments and with the features of embodiment 8, wherein the visual features added to the map comprise night-time features (2).

11. A method according to any of the preceding embodiments and with the features of embodiment 8, wherein the visual features added to the map comprise twilight visual features (1T, 2T).

12. A method according to any of the preceding embodiments and with the features of embodiment 8, wherein the estimation of the location is facilitated by comparing visual features extracted from at least one image captured on the location with visual features comprised by the map used to estimate the location.

13. A method according to any of the preceding embodiments and with the features of embodiment 8, wherein estimation of the location during daytime is facilitated by day-time features (1).

14. A method according to the preceding embodiment and with the features of embodiment 8, wherein estimation of the location during low light conditions is facilitated by night-time features (2).

15. A method according to any of the preceding embodiments and with the features of embodiment 8, wherein the estimation of the location is facilitated by at least one or any combination of
at least one GPS sensor, at least one dead-reckoning sensor, at least one accelerometer, at least one gyroscope, at least one time of flight camera, at least one Lidar sensor, at least one odometer, at least one magnetometer, and at least one altitude sensor.

16. A method according to any of the preceding embodiments, wherein the day-time features (1) comprise a plurality of straight lines (1).

17. A method according to the preceding embodiment, wherein the straight lines (1) are extracted from patterns on images that have a shape of a substantially straight line.

18. A method according to any of the preceding embodiments and with the features of embodiment 16, wherein the straight lines (1), belong to stationary objects such as road endings, sides of buildings, sides of signs, fences.

19. A method according to any of the preceding embodiments and with the features of embodiment 16, wherein the straight lines (1) are extracted from an image by
applying an edge detector algorithm on the image; and
applying a line extracting algorithm on the results of the edge detector algorithm.

20. A method according to the preceding embodiment, wherein the edge detecting algorithm is the Canny algorithm.

21. A method according to any of the preceding embodiments and with the features of embodiment 19, wherein the line extracting algorithm is the Hough transform.

22. A method according to any of the preceding embodiments, wherein the night-time features (2) comprise urban lights (2).

23. A method according to the preceding embodiment, wherein the urban lights (2) belong to switched-on artificial light sources captured on images.

24. A method according to any of the preceding embodiments and with the features of embodiment 22, wherein the urban lights (2) are extracted from at least one image by detecting stationary bright spots.

25. A method according to any of the preceding embodiments, wherein the night-time features comprise night-time straight lines (1N).

26. A method according to any of the preceding embodiments, wherein the method is used as a Simultaneous Localization and Mapping (SLAM) method.

27. A method according to any of the preceding embodiments, wherein twilight is defined by the sun being located between 0° and 18° below the horizon, preferably between 0° and 12° below the horizon, such as between 0° and 6° below the horizon.

It will be understood that all the degrees provided herein typically refer to the center of the sun.

28. A method according to any of the preceding embodiments, wherein day-time features (1) are features that are visible on images captured during daytime, wherein daytime is defined by the sun being located above the horizon.

29. A method according to any of the preceding embodiments, wherein night-time features (2) are features that are visible on images captured during night-time, wherein night-time is defined by the sun being located more than 6°, preferably more than 12°, such as more than 18° below the horizon.

30. A method according to any of the preceding embodiments and with the features of embodiment 4, wherein at least one twilight straight line (1T) is added to the map, and wherein this adding comprises
downsizing the at least one image captured during twilight to generate a downsized twilight image, and determining the at least one twilight straight line by means of the downsized twilight image.

31. A method according to any of the preceding embodiments and with the features of embodiment 16, wherein at least one straight line (1) is added to the map, and wherein this adding comprises downsizing at least one image captured during daytime to generate a downsized daytime image, and determining the at least one straight line (1) by means of the downsized daytime image.

32. A method according to any of the preceding embodiments and with the features of embodiment 25, wherein at least one night-time straight line (1N) is added to the map, and wherein this adding comprises
    downsizing at least one image captured during night-time generate a downsized night-time image, and determining the at least one night-time straight line by means of the downsized night-time image.

33. A method according to any of the preceding embodiments, wherein the map further comprises information regarding the relative position of the night-time visual features (2) and day-time visual features (1) relative to the Earth, such as, relative to any of the center of the Earth, Equator and Prime meridian.

34. A method according to any of the preceding embodiment, wherein the ISO 6709 Standard Representation of Geographic Point Location by Coordinates is used to represent the relative position of the night-time visual features (2) and day-time visual features (1) relative to the Earth.

35. A method according to any of the preceding embodiments, wherein the map further comprises information related to a position of any of roads and buildings of a location.

36. A method according to the preceding embodiment, wherein the map comprises information regarding the relative position of the roads and building relative to the day-time features (1) and night-time features (2).

37. A method according to any of the preceding embodiments, wherein the generation of map comprising day-time features (1) and night-time features (2) is facilitated by a mobile robot driving at a location and extracting any of day-time features (1) and night-time features (2) from images captured at that location.

38. A method according to the preceding embodiment, wherein one or more mobile robot drive at one or more locations and generate a map comprising day-time features (1) and night-time features (2) of each location.

39. A method according to the preceding embodiment, wherein a map of a location can be extended with a map of another location if the relative position between the first and the second location is known.

40. A method according to the preceding embodiment, wherein a map of a location can be extended with a map of another location if the maps overlap each other, such that the maps comprise common visual features (1, 2).

Below, methods of mapping features according to embodiments of the invention will be discussed. These embodiments are abbreviated with the letter "M" followed by a number and referred to as mapping embodiments.

M1. A method for mapping features, the method comprising
    based on at least one image comprising the features,
        generating a first hypothesis for locations of the features by taking into account a subset of the features,
        generating a second hypothesis for locations of the features by taking into account the first hypothesis and features that are not included in the subset of features, and mapping the features according to the second hypothesis.

M2. The method according to the preceding embodiment, wherein the subset of features does not comprise features comprising a cluster characteristic below a cluster threshold.

M3. The method according to the preceding embodiment, wherein the cluster characteristic is a minimum pixel distance of a feature to another feature and wherein the cluster threshold is a pixel threshold.

M4. The method according to any of the preceding mapping embodiments and with the features of embodiment M2,
    wherein the cluster characteristic is a minimum angular distance of a feature to another feature and wherein the cluster threshold is an angle threshold.

The angular distance between two features is the angle created between a first and a second vector (or segment, or line) comprising the same origin (or intersecting at a point) and wherein the first vector is directed towards the first feature and the second vector is directed towards the second feature. It will be understood that the origin may typically be a camera (e.g., mounted on a robot) capturing the image comprising the features.

M5. The method according to any of the preceding mapping embodiments and with the features of embodiment M2,
    wherein the cluster characteristic is a minimum real-world distance between the physical object corresponding to a feature and the physical object corresponding to another feature and wherein the cluster threshold is a real-world distance threshold.

M6. The method according to any of the preceding mapping embodiments, wherein the features are point features, such as light sources.

M7. The method according to any of the preceding mapping embodiments, wherein the method comprises
    iteratively generating additional hypotheses, wherein for each hypothesis n, the hypothesis n is generated by taking into account hypothesis n−1 and features that are not included in a subset of the features for the hypothesis n−1.

M8. The method according to the preceding embodiment and with the features of embodiment M2, wherein the cluster threshold is iteratively lowered for the additional hypotheses.

M9. A method for mapping features, the method comprising
    based on at least one image comprising the features,
        assigning a weight to each of the features, wherein the weights are different for at least two features,
    based on the weights assigned to the features, generating a hypothesis for locations of the features, and mapping the features according to the hypothesis.

M10. The method according to the preceding embodiment, wherein the features are line segment features and/or point features, such as light sources.

M11. The method according to any of the 2 preceding embodiments, wherein the weight assigned to each feature depends on a minimum distance of the respective feature to another feature.

M12. The method according to the preceding embodiment, wherein the minimum distance is a minimum pixel distance.

M13. The method according to any of the 2 preceding embodiments, wherein the minimum distance is a minimum angular distance.

M14. The method according to any of the 3 preceding embodiments, wherein the minimum distance is a minimum real-world distance of the physical object corresponding to the respective feature to the physical object corresponding to another feature.

M15. The method according to any of the 4 preceding embodiments, wherein a greater weight is assigned to a first feature having a greater minimum distance to another feature than to a second feature having a smaller minimum distance to another feature.

M16. The method according to any of the 5 preceding embodiments, wherein a weight function for the features that depends on the minimum distance to another feature is monotonically increasing with increasing minimum distance to another feature.

M17. The method according to the preceding embodiment, wherein the weight function is strictly increasing with increasing minimum distance to another feature.

Below, a localization method according to embodiments of the invention will be discussed. These embodiments are abbreviated with the letter "L" followed by a number and referred to as localization embodiments.

L1. A method of localizing an object, the method comprising
based on at least one image comprising features, generating a first localization hypothesis for a location of an object by taking into account a subset of the features,
generating a second localization hypothesis for the location of the object by taking into account the first localization hypothesis and features that are not included in the subset of features, and localizing the object according to the second localization hypothesis.

L2. The method according to the preceding embodiment, wherein the subset of features does not comprise features comprising a cluster characteristic below a cluster threshold.

L3. The method according to the preceding embodiment, wherein the cluster characteristic is a minimum pixel distance of a feature to another feature and wherein the cluster threshold is a pixel threshold.

L4. The method according to any of the preceding mapping embodiments and with the features of embodiment L2, wherein the cluster characteristic is a minimum angular distance of a feature to another feature and wherein the cluster threshold is an angle threshold.

The angular distance between two features is the angle created between a first and a second vector (or segment, or line) comprising the same origin (or intersecting at a point) and wherein the first vector is directed towards the first feature and the second vector is directed towards the second feature. It will be understood that the origin may typically be a camera (e.g., mounted on a robot) capturing the image comprising the features.

L5. The method according to any of the preceding mapping embodiments and with the features of embodiment L2, wherein the cluster characteristic is a minimum real-world distance between the physical object corresponding to a feature and the physical object corresponding to another feature and wherein the cluster threshold is a real-world distance threshold.

L6. The method according to any of the preceding localization embodiments, wherein the features are point features, such as light sources.

L7. The method according to any of the preceding localization embodiments, wherein the method comprises
iteratively generating additional localization hypotheses, wherein for each localization hypothesis n, the localization hypothesis n is generated by taking into account localization hypothesis n−1 and features that are not included in a subset of the features for the localization hypothesis n−1.

L8. The method according to the preceding embodiment and with the features of embodiment L2, wherein the cluster threshold is iteratively lowered for the additional localization hypotheses.

L9. A method of localizing an object, the method comprising
based on at least one image comprising features, assigning a weight to each of the features, wherein the weights are different for at least two features,
based on the weights assigned to the features, generating a localization hypothesis for a location of the object, and localizing the object according to the localization hypothesis.

L10. The method according to the preceding embodiment, wherein the features are line segment features and/or point features, such as light sources.

L11. The method according to any of the 2 preceding embodiments, wherein the weight assigned to each feature depends on a minimum distance of the respective feature to another feature.

L12. The method according to the preceding embodiment, wherein the minimum distance is a minimum pixel distance.

L13. The method according to any of the 2 preceding embodiments, wherein the minimum distance is a minimum angular distance.

L14. The method according to any of the 3 preceding embodiments, wherein the minimum distance is a minimum real-world distance of the physical object corresponding to the respective feature to the physical object corresponding to another feature.

L15. The method according to any of the 4 preceding embodiments, wherein a greater weight is assigned to a first feature having a greater minimum distance to another feature than to a second feature having a smaller minimum distance to another feature.

L16. The method according to any of the 5 preceding embodiments, wherein a weight function for the features that depends on the minimum distance to another feature is monotonically increasing with increasing minimum distance to another feature.

L17. The method according to the preceding embodiment, wherein the weight function is strictly increasing with increasing minimum distance to another feature.

C1. A method comprising
the method for mapping features according to any of the preceding mapping embodiments and
the method of localizing an object according to any of the preceding localization embodiments.

41. The method according to any of the embodiments 1 to 40, wherein the method further comprises any of the features recited in the preceding mapping embodiments and/or in the preceding localization embodiments.

Below, processing unit embodiments will be discussed. These embodiments are abbreviated by the letter P followed by a number. Whenever reference is herein made to processing unit embodiments, these embodiments are meant.

P1. A processing unit configured to execute the method according to any of the preceding embodiments.

P2. A processing unit according to the preceding embodiment, configured to extract day-time features (1), from an image.

P3. A processing unit according to any of the preceding processing unit embodiments, configured to extract night-time features (2) from an image.

P4. A processing unit according to any of the preceding processing unit embodiments, wherein the processing unit is part of a mobile robot and facilitates the mobile robot's navigation and localization.

DESCRIPTION OF VARIOUS EMBODIMENTS

In the following, exemplary embodiments of the invention will be described, referring to the figures. These examples are provided to give further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps can be present between some or all of the described steps.

Figure 1:
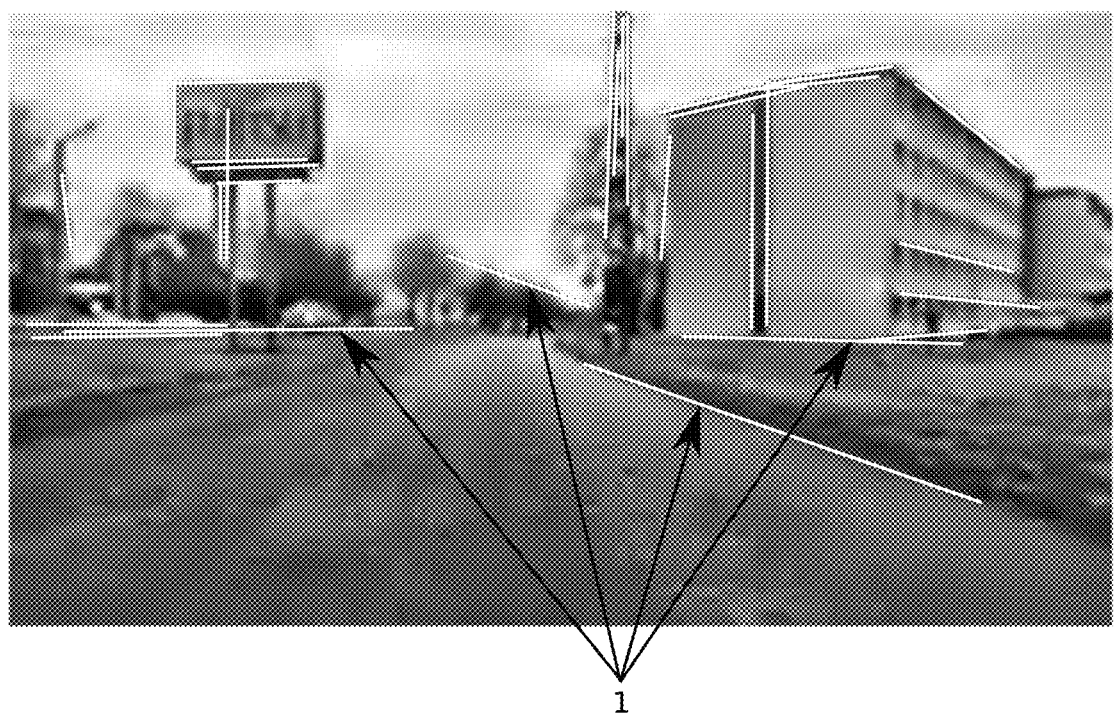
FIG. 1 shows an image of a camera with visual features extracted during day-time.

FIG. 1 shows an exemplary image of a camera with visual features extracted during day time. FIG. 1 shows a plurality of visual features that can be extracted from an image during day time for localization and mapping purposes. The visual features extracted from an image taken during day time can be referred throughout the text as day-time visual features 1, or as day-time features 1. The day-time features 1 can be straight lines 1 that can be extracted from an image. Straight lines 1 can belong to permanent objects, such as buildings, fences, sidewalks, and/or transitory objects, such as cars, shadows or other moving traffic participants.

The images can be captured by a mobile robot. The mobile robot can be fully autonomous or partially autonomous. For example, the autonomy level of the mobile robot can be between the levels 1 to 5, as defined by the Society of Automotive Engineers (SAE) in J3016—Autonomy Levels. In some embodiments, the mobile robot can be a fully autonomous mobile robot (i.e. autonomy level 5 according to SAE). That is, the fully autonomous mobile robot can navigate, drive and execute other functionalities related to its operation on its own without a human operator controlling it. In some embodiments, the mobile robot can be partially- or semi-autonomous (e.g. any of autonomy levels 1 to 4 according to SAE). That is, the nearly autonomous mobile robot can in some instance and/or for some functionalities operate on its own and in some other instance and/or other functionalities be assisted by a human operator.

Further, the mobile robot can comprise at least one processing unit which can be configured to extract visual features from an image. The visual features extracted from the images can be used by the mobile robot for localization and/or mapping.

During its operation, the mobile robot is configured to capture images of its surroundings. That is, the mobile robot can comprise at least one camera. The mobile robot can be configured to capture at least one image, preferably a plurality of images of its surroundings. The mobile robot may be configured to capture images with a predefined frequency, such as every time it is required for the mobile robot to gather data for localization or mapping. The frequency of capturing such images may be programmed on the mobile robot or may be communicated to the mobile robot by a server or a remote operator. Further, the frequency that the mobile robot can capture images of its surroundings may depend on the speed that the mobile robot is moving. For example, when the mobile robot is moving with high speeds the need for localization and mapping can be higher and thus the frequency of capturing the images is higher than the case when the robot is moving with a low speed or is not moving at all. Further, the frequency of capturing such images may also depend on the environment that the mobile robot is operating.

The images of the surroundings of the mobile robot are fed to a processing unit. That is the mobile robot can comprise a processing unit configured to process images. The images can also be processed in a remote unit outside the mobile robot, such as in a remote server. In the latter embodiment, the mobile robot can have a communication component for uploading data to and downloading data from said server. The processing component can be a System-on-Chip (SoC), preferably comprising at least one Graphical Processing Unit (GPU) or Central Processing Unit (CPU) or both. The processing unit can be configured to execute an image processing algorithm on the images captured by the mobile robot for extracting visual features 1 from an image. In the embodiment of FIG. 1, day-time visual features 1, i.e. straight lines 1, are extracted from the exemplary image. Such straight lines 1 are extracted from patterns on the exemplary day-time image of FIG. 1 that have a shape of a substantially straight line. Such straight-line patterns, i.e. straight lines 1, may belong to road endings, sides of buildings, sides of signs, fences etc.

The straight lines 1 can be extracted from the image by applying an edge detecting algorithm, such as for example the Canny algorithm and then using a line extracting algorithm on the result of the edge detecting algorithm. The line extracting algorithm can be the Hough transform. Also, other edge detection algorithms or line detection algorithms can be used for the purpose of extracting lines from an image. Methods of extracting straight lines from an image and using them for mapping and localization are described in more details in patent applications WO2017076928A1 and WO2017076929A1.

The mobile robot can comprise or have access to map data. The map data can comprise visual features related to the environment the robot is currently operating in. The mobile robot can compare the straight lines 1 extracted from the visual images it captured with the visual features of the map data the robot has access to. That is, the mobile robot can comprise a memory component for storing said map data. In another embodiment, the mobile robot can comprise a communication component for communicating to a remote server where the robot can download the map data from. From the comparison of the extracted straight lines 1 with the map data the mobile robot can estimate its position on the map, that is the mobile robot can localize itself. For example, the map data are configured to map a set of environment features, such as visual features or straight lines, to their respective position in space. On the other side, the mobile robot can identify the position of the extracted visual features from the image, i.e. straight lines 1, relative to the mobile robot. Thus, by comparing the visual features extracted from the images with the map data, the mobile robot, in cases where a similarity is found, can determine its position in the real world.

That is, the map data can correspond to different position possibilities of the robot. In one embodiment, the robot can use the Particle Filter algorithm to evaluate the likelihood of each position being the true one. The most likely position can provide, within certain errors, the localization of the robot at the time the images were taken. Further details of estimating the pose of the mobile robot using the map data and visual features are provided in patent applications WO2017076928A1 and WO2017076929A1.

Further sensors and/or data, may be used by the mobile robot to determine the orientation of the mobile robot, such as a gyroscope. In such embodiments, the mobile robot not only can determine its localization but can determine its pose, that is the robot's localization and orientation.

In another embodiment, the mobile robot may not comprise or may not have access to said map data, or the map data do not exist. In such cases the mobile robot creates the map data and further or simultaneously can localize itself. If localization and mapping is performed simultaneously, this method is often referred to as Simultaneous Localization and Mapping (SLAM). The mobile robot can combine the extracted lines to build map data of the area the visual images were taken in.

In some embodiments, the mobile robot can further extract location-related data from at least one further sensor. Said sensor can comprise, for example, at least one or a combination of at least one GPS sensor, at least one dead-reckoning sensor, at least one accelerometer, at least one gyroscope, at least one time of flight camera, at least one Lidar sensor, at least one odometer, at least one magnetometer and/or at least one altitude sensor. The mobile robot can then further combine said location-related data with the data from the visual images to build map data. That is, in some embodiments, the mobile robot can use data from its other sensors to obtain an approximate map of an operating area it finds itself in, and then refine this approximate map using the extracted straight lines 1. Alternatively or additionally, the robot can build map data using the extracted straight lines 1 and other sensor readings simultaneously. This is advantageous, as the other sensors' data can serve as a "sanity check", or as means to make the camera images-based map built from the straight lines more precise and reliable.

Figure 2:
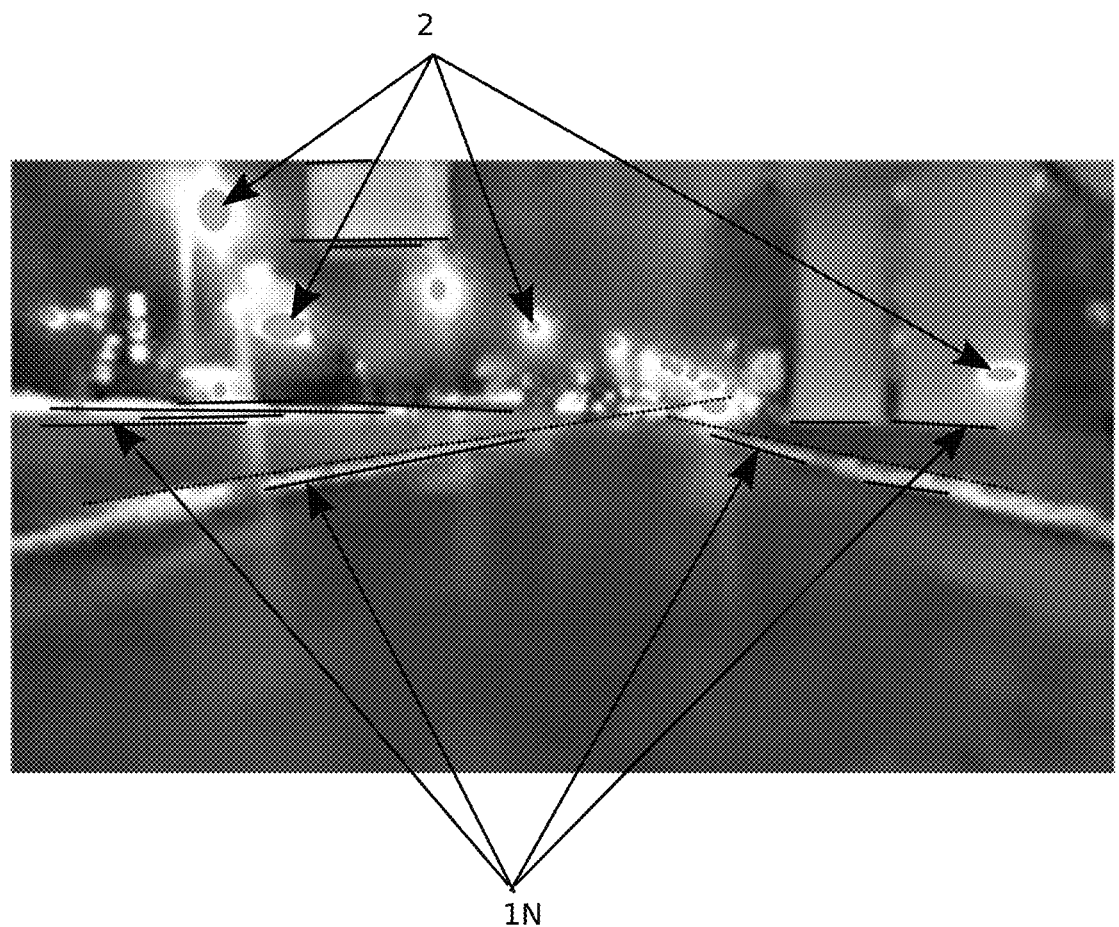
FIG. 2 shows an image of a camera with visual features extracted during low light condition.

FIG. 2 shows an exemplary image of a camera with visual features extracted during low light conditions. FIG. 2 depicts an exemplary image of the same environment of FIG. 1, but during low light conditions (e.g., during night-time), and a set of visual features extracted from the image. The visual features extracted from an image taken at low light conditions, such as taken during the night, may be referred as night visual features 2, or simply as night features 2. The visual features extracted from an image taken during low light conditions, such as during the night, can comprise night straight lines 1N which can belong to permanent objects, such as buildings, fences, sidewalks, and/or transitory objects, such as cars, shadows or other moving traffic participants. Note that the night straight lines 1N belong to the category of day-time features 1 (refer to FIG. 1), but since they are detected at low light conditions, such as at night, they are referred as night straight lines 1N, to make a distinction from the day-time features 1 which are detected at good light conditions.

Further the visual features extracted from an image taken at low light conditions, such as at night, can comprise night visual features 2, such as the urban lights 2 shown in FIG. 2 highlighted with an ellipse shape for human visualization purposes only. The urban lights 2 can comprise any artificial light source such as street lights 2, illuminated signs 2, illuminated windows 2, etc.

Put it simply, a plurality of visual features can be extracted from an image. The visual features can be some predefined patterns that can be detected on an image. When used for localization, a mobile robot for example, can capture at least one image of the surroundings and can process the captured images to extract said patterns from them, i.e. the visual features. Such patterns can be shapes on the image that are substantially straight (i.e. straight lines) or can be lights appearing on the image as bright spots (i.e. urban lights). Logically it can be understood that if the image is taken at good light conditions, such as during the day, the shapes of the objects captured on the images are more visible and easily to be detected and in contrary, if the image is taken at low light conditions, such as during the night, the lights can be more visible and easily detected than the shapes of objects. Thus, the visual features extracted from an image comprise day-time features 1, such as the straight lines 1 (i.e. substantially straight shapes of objects captured on image) and the night time features 2, such as the urban lights 2 (i.e. the bright spots on the images created by lights). On an image taken at good light conditions, such as during the day, the day-time features 1 are more dominant than the night-time features 2 as normally during the day the urban lights are off and even if they would be on it would be very hard to detect them since they do not appear as bright spots on the image due to good light conditions. On an image taken at low light conditions, such as during the night, the urban lights 2 would be switched on and would appear on images as bright spots and thus can easily be detected. Even though the lights conditions are bad, still there may be some straight-line patterns detected on the images taken at low light conditions, that is, night straight lines 1N can be detected. However, the urban lights 2 are the predominant visual features used at low light conditions.

The night straight lines 1N can be extracted from an image using the same manner as described for the extraction of straight lines 1 extracted from an image taken at day-time, described in FIG. 1. However, due to the low illumination, since the exemplary image of FIG. 2 is taken at low light conditions, such as at night time, the night straight lines 1N detected during night time are usually different from the straight lines 1 (see FIG. 1) detected during day time (i.e. they belong to different objects or parts of the objects, or they can belong to the same part of the object but due to low light conditions appear in a different position compared to straight lines 1). That is, most or some of the lines that are visible during the day are not visible during the night or they are barely visible during the night. Thus, they may be insufficient to be used on their own for localization. For this reason, in the embodiment of FIG. 2 the mobile robot extracts further features from the image, such as the urban lights 2.

In some embodiments, the urban lights 2 can be extracted from an image, in a similar manner to the one used for the extraction of straight lines 1. In some other embodiments, the urban lights 2 can be extracted from an image using brightness thresholding. The urban lights 2 show up in images as bright spots and thus are relatively easy to detect and locate on an image. Camera parameters may further be configured to decrease the noise and saturation associated with the fact that the urban lights 2 can be much brighter than their surroundings.

Further most of urban lights 2 detected at low light conditions, such as at night, belong to signs, street lights, illuminated windows, which can be considered as permanent objects, that is they do not change their position for a substantially long time such as weeks, months or even years. This makes the urban lights 2 a good reference to be used for localization and mapping purposes. However, other sources of light may be detected during the night, said sources being non-static objects, such as the headlights of a car. Such dynamic light sources can be removed and not taken for reference. This can be done by taking a sequence of images at different times. A moving object can create large blobs on the image compared to the non-moving objects and thus can be classified by the mobile robot as a moving object and ignored.

The localization and mapping using the night visual features such as the urban lights 2 and the night straight lines 1N is performed by the mobile robot in a similar manner to the one depicted and described in FIG. 1 using the day-time visual features 1. Thus, a further description of the localization and mapping using the night visual features 2 is omitted for the sake of brevity.

Put differently, the type of visual features to use depends on the environment and light conditions in which the robot operates. During daylight, the robot can use straight lines 1 detected from camera images, because the lines do not change much under different times of day or different seasons of the year. The only exception is night time, or time with low light condition, when most lines visible during the day are not visible anymore and few additional lines are visible. However, during the dark evening hours, a new type of visual features become prominent—artificial light sources, which can also be referred as urban lights 2. These can be street lights, signs, illuminated windows of homes and businesses, etc. The lights show up as bright spots on otherwise mostly dim camera images. Mapping and localization using these features are analogous to mapping and localization using straight lines. In other words, the mobile robot does not ignore the few lines it sees at night, but lights make up the majority of the useful localization data at night. It is noted that lines that are visible at night are often created by lighting and shadows, so they are not visible during the day, i.e., the lines visible during the night may be different from the lines visible during the day.

Figure 3:
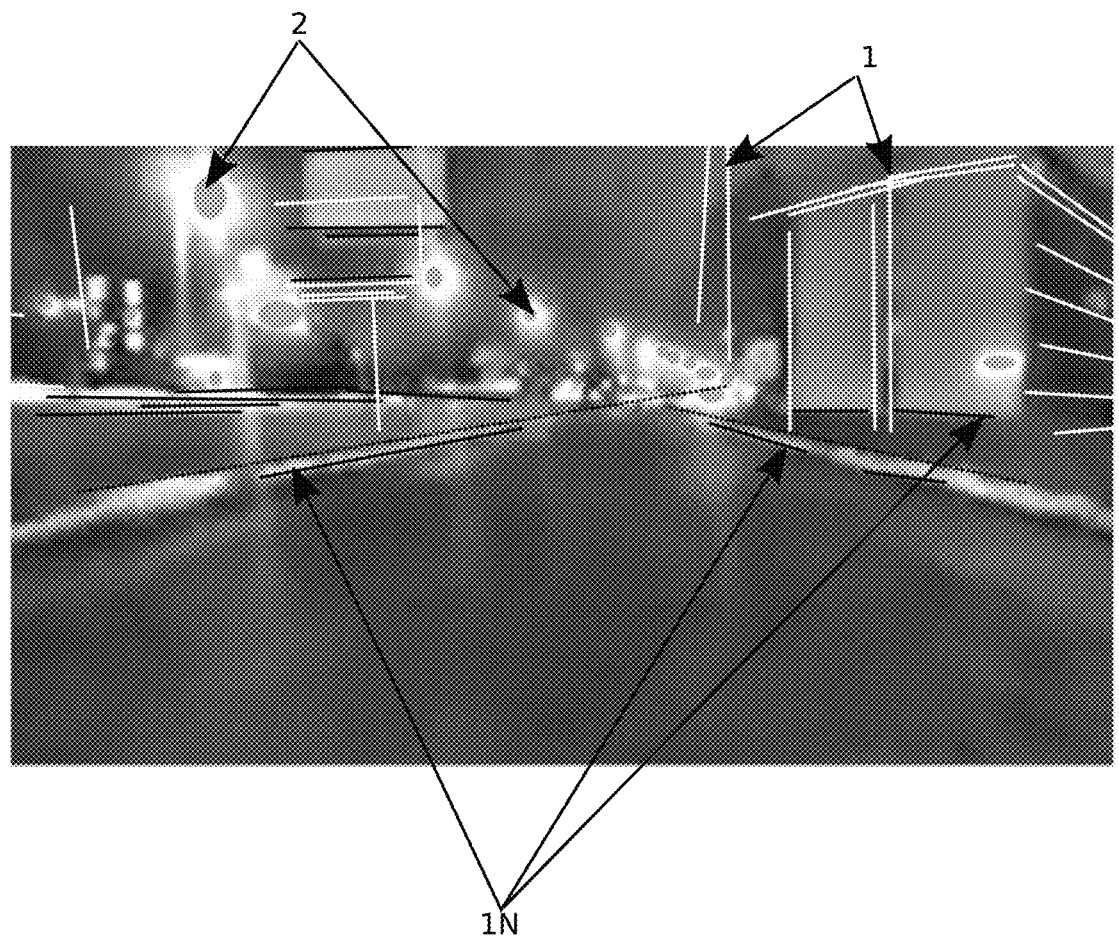
FIG. 3 shows an image of a camera with visual features extracted from day-time with visual features extracted from night time from an exemplary image.

FIG. 3 illustrates visual features extracted from day-time with visual features extracted from night time from an exemplary image. More particularly, FIG. 3 is a night-time image, i.e., an image obtained with low light conditions, where features visible at night, also referred to as night-time features 2, e.g., night straight lines 1N and lights 2 are visible. Furthermore, in FIG. 3, also day-time features 1, e.g., day-time straight lines 1 are shown. It will be understood that the day-time features 1 are usually different from the night-time features 2, i.e., the features that can be obtained during the day (or, generally, during good light conditions) are different from the features that can be obtained during the night (or, generally, during low light conditions).

In FIG. 3 the night straight lines 1N and the urban light 2 are depicted. Such visual features can be extracted from an image taken at night time or at low light conditions as depicted and described in FIG. 2. Further FIG. 3 shows the day-time straight lines 1. Such visual features can be extracted from an image taken at day-time as depicted and described in FIG. 1.

From FIG. 3 it can be noticed that there is very few or almost no commonality between straight lines 1 seen at day-time and night straight lines 1N seen at night, since there are very few similarities between the day-time visual features 1 and night time visual features 2.

Put differently, FIG. 3 illustrates the problem of merging maps with different types of features. The problem may arise from the inaccuracy of anchoring a map to real world locations. Multiple maps can be merged into one map if similarities between the maps can be detected. In the case of using different visual features for day-time and night-time maps, the similarities can be limited to the outputs from other sensors, if present, such as e.g. GPS signal. However, GPS and other sensors can be inaccurate, resulting in merged maps whose constituent maps are not aligned properly. This kind of inaccurately merged map will create further problems when additional data is added to the map, e.g. locations of roads or obstacles. If the additional data is accurate relative to the objects on the map that were mapped using day-time data, then it will be less accurate relative to the objects that were mapped using night time data.

To better understand the scenario of FIG. 3 the following example is provided. The mobile robot comprises two sets of map data: the day-time map data and the night time map data. The set of day-time map data can be referred as $S_D$ and the set of night time map data can be referred as $S_N$. The set of day-time map data may comprise a plurality of day-time features 1, such as day-time straight lines 1, and the set of night time map data may comprise a plurality of night-time features 2, such as night straight lines 1N and urban lights 2. Assume a scenario wherein the two sets of above-mentioned map data comprise similarities between each other. Such similarities can be for example a subset of straight lines 1 taken from the set of day-time visual features and a subset of night straight lines 1N taken from the night-time visual features. Such similarities can be obtained by intersecting the sets $S_D$ and $S_N$ and can be referred as the common subset C. That is $C=S_D \cap S_N$, i.e. C is the intersection of the set of day-time map data and night time map data. In such a case, the robot can use the common subset C to align the two sets of map data $S_D$ and $S_N$, the day-time map data with the night time map data. Confidence that the two sets of map data $S_D$ and $S_N$ are aligned with each other can be inferred from the fact that the map data within a map are accurate relative to each other. That is any element from the day map data $S_D$ is accurately mapped relative to other elements of day map data $S_D$ and any element from the night map data $S_N$ is accurately mapped relative to other element of night map data $S_N$. Thus, aligning the elements from $S_D$ and $S_N$ that are included in C (i.e. aligning the common elements), the whole set of day map data is aligned with the whole set of night map data resulting in an accurate merged map.

However, the day map data comprise very few similarities with the night map data since they are created using different visual features. In day-time map data, the dominant visual features are the straight lines 1 while in the night-time map data the dominant visual features are the urban lights 2, and night straight lines 1N, which, however, may not coincide with day-time straight lines 1. Thus, illustrating with the previous example again, the intersection C of $S_D$ and $S_N$, may comprise very few elements or in a worst case may be an empty set. Thus, the abovementioned map data will be inaccurately merged and misaligned with each other as it can be seen in FIG. 3. To solve such problem, it can be advantageous to extend the common set C. That is, extending the commonality between data and features of two maps can facilitate the process of merging the two maps.

In FIG. 3, the mobile robot is localizing itself in low light conditions, such as at night. The mobile robot can be provided with day-time map data or may have access to a server comprising day-time map data, i.e. map created at good light conditions, comprising day-time visual features 1 e.g. straight lines 1. For the process of localizing itself the mobile robot can take at least one image of its surroundings. From the at least one captured image the mobile robot can extract night visual features 2, such as the urban lights 2 and the night straight lines 1N. As mentioned above the mobile robot can comprise or have access to day-time map data. To estimate its position, the mobile robot can compare the night visual features 2, with the visual features comprised by the day-time map data. Since the visual features in the day-time map data are extracted from images taken during day-time, it can be inferred that there are very few similarities between the day-time visual features 1 and night time visual features 2. For example, during day-time most of the urban lights 2 are off and thus would not be on the image or the straight lines 1 are not that common during the night as it becomes harder to detect them on the images taken at low light conditions. So, the mobile robot can estimate its position using the very few similarities between the day-time visual features 1 and the night time visual features 2 in conjunction or not with the use of other sensors such as GPS. Since the similarities are few and the output from sensors such as GPS can be quite inaccurate, the estimation of the location of the mobile robot would not be correct resulting in an offset between the estimated position and the real one. A rationale for the offset can be seen on FIG. 3, wherein the straight lines 1 are projected on the image using the estimated position. It can be seen that the day-time features 1 are not properly aligned with the night-time features 2. That is, the commonalities between the day-time features 1 and the night-time features 2 may be relatively low. This may result in an offset between maps based on day-time features and based on night-time features. Such an offset can represent the error that was done during estimation of the position of the mobile robot.

Thus, an aspect of the present invention is to generate a map comprising day-time visual features 1 and night time visual features 2 that are properly aligned with each other. This can be done by merging two maps comprising respectively day-time visual features 1, such as straight lines 1, and night time visual features 2 such as urban lights 2 and night straight lines 1N. The map comprising day-time visual features 1 and night time visual features 2 can also be generated by extending an existing map comprising day-time visual features 1 with night time visual features 2 or by extending an existing map comprising night time visual features 2 with day-time visual features 1 or by extending a map with day-time visual features 1 and night time visual features 2. A further aspect of the invention is to extend the commonality between the day-time map data and the night time map data. This can facilitate the generation of a map comprising day-time visual features 1 and night time visual features 2.

The solution presented herein to the problem of merging map data with no or low commonality between them comprises introducing additional visual data to the map. More particularly, to better merge day-time maps with night time maps, further mapping data are collected during twilight when some of the day-time visual features 1 are detected and some of the night-time visual features 2 are detected. Because of the higher accuracy of the visual data compared to other sensors such as GPS, or wheel odometry, etc., the merged map will have a better accuracy than the merged map without the use of twilight data. If additional data is added to the map and the data is accurate relative to the parts of the map created using day-time data, it will be also accurate relative to night-time data. This will save mapping effort, as the additional data will need to be attached to just one universal map instead of multiple different maps. These concepts are depicted in the following figures, FIG. 4 and FIG. 5.

Figure 4:
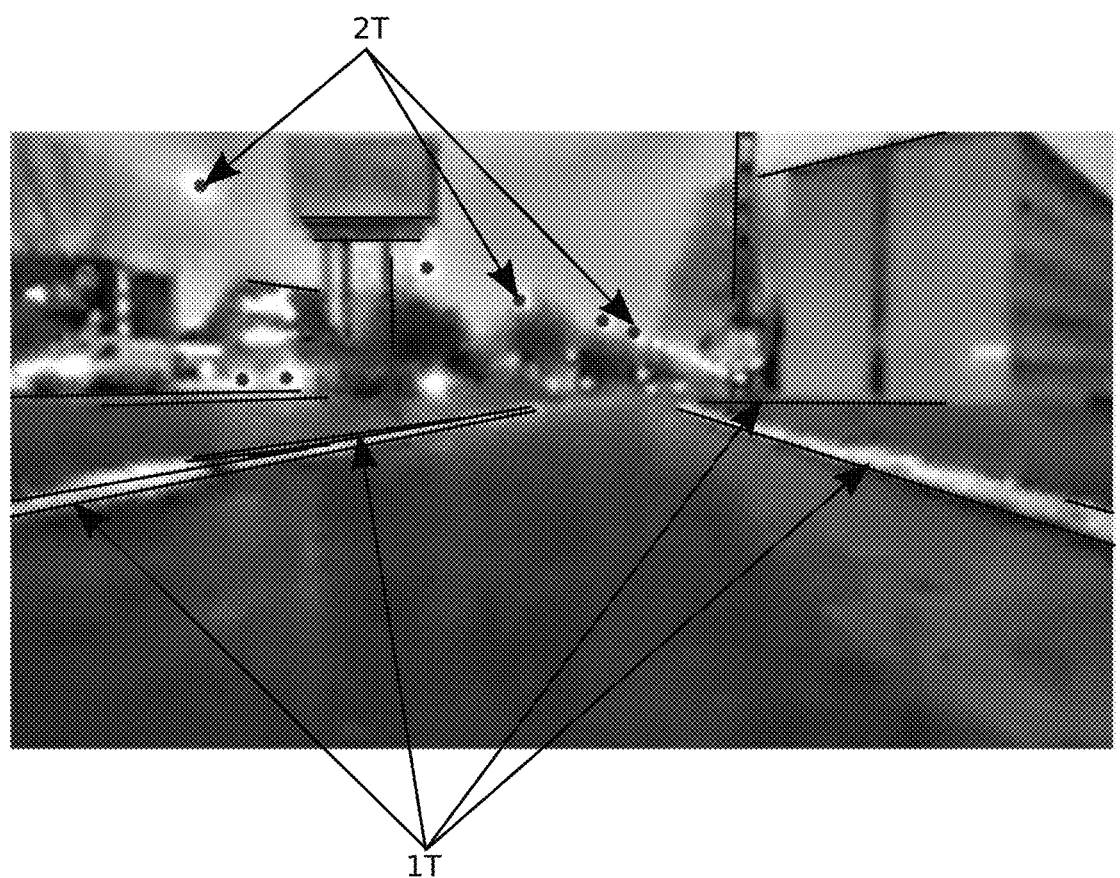
FIG. 4 shows an image with visual features extracted during twilight time.

FIG. 4 shows an image with visual features extracted during twilight time. FIG. 4 depicts an exemplary image taken at twilight time, that is in a period of time wherein the sunlight is bright enough for (at least some of) the straight lines visible during day-time to be detected in a similar manner that they would be detected during the day, but still it is dark enough for the urban lights, such as the street lights, to be on and easily detected. FIG. 4 may depict an image taken at a time when the sun is less than 18° below the horizon, preferably below 12°, such as between 3° to 8° below horizon.

In FIG. 4 visual features are extracted from an image taken at twilight time, which can also be referred as twilight visual features 1T, 2T, comprising the twilight urban lights 2T and the twilight straight lines 1T. It should be understood that the twilight urban lights 2T belong to the category of the night time visual features 2 and since they are detected during twilight time they are referred as twilight urban lights 2T to distinct them from urban lights 2 detected during night time. It should also be understood that the twilight straight lines 1T belong to the category of day-time features 1 and since they are detected during twilight time they are referred as twilight straight lines 1T to distinct them from the straight lines 1 detected during day-time and night straight lines 1N detected during nigh-time.

The straight lines 1T seen at twilight are similar to the straight lines 1 seen during the day. Put differently, at least some of the twilight straight lines 1T may coincide with the day-time straight lines 1. This happens because during twilight the light conditions can be relatively good, or at least can be better than during the night, which increases the chances of straight lines patterns being captured and detected on the images taken at twilight. Additionally, urban lights 2T can be switched on during twilight and thus can be extracted from the images taken at twilight. That is, some of the night-time features are also visible during twilight. Put differently some of the twilight urban lights 2T may coincide with the night-time urban lights 2. This happens because during twilight the lights can still appear as bright spots on images, at least can appear as bright spots better than they would during the day, which increases the chances of the bright spots (i.e. urban lights) to be captured and detected on an image taken at twilight.

Thus, the twilight map data comprises visual features that are part of the day-time map data such as the straight lines 1T that are similar with the straight lines 1 and also comprises visual features that are part of the night time map data such as the urban lights 2T that are similar with the urban lights 2. The straight lines 1T and the urban lights 2T extracted from an image taken at twilight time are accurately mapped relative to each other since they are gathered in a coherent manner (i.e. they are gathered from the same images, and the error of possible misalignment between them corresponds only to the error associated with the image processing algorithm used to extract the features from the images, which in most of the cases is very small and can be neglected). Furthermore, most of the straight lines 1T are similar to the straight lines 1, because at twilight time it is bright enough for the camera(s) to capture the same visual features in similar manner as they would capture them during day-time. Furthermore, most of the urban lights 2T extracted at twilight are similar to the urban lights 2 extracted at night, since it is dark enough and the urban lights are still on for the cameras to capture the same visual features 2 in similar manner as they would capture them during night time. In other words, the map data gathered at twilight provide the relative positions between the visual features extracted at day-time and the visual features extracted at night time. This way the maps can be correctly merged into one map.

In one embodiment, the mobile robot can comprise or have access to map data that comprise day-time visual features 1, such as the straight lines 1. Such map data can also be referred as day-time map. As discussed above it can be advantageous for the mobile robot to extend the day-time map with night time visual features 2, so that the mobile robot can use such one general map to localize itself during day and night. To facilitate such extension, the mobile robot extracts visual features from images taken during twilight time. The reason why twilight time is chosen, is that during twilight the light conditions are good, or at least good enough for the straight lines 1T extracted from an image taken at twilight to comprise almost all or at least a part of the straight lines 1 that can be extracted during day-time, or the straight lines 1 that the day-time map comprises. At the same time, the light is low enough for the urban lights to be switched on. Thus, they will appear in the images taken at twilight and can be extracted from the mobile robot as visual features.

As depicted in FIG. 4, the mobile robot can extract from the same image the straight lines 1T and the urban lights 2T. Note, that detecting the straight lines and the urban lights in the same image cannot be possible on images taken during the day or during the night, in the sense that during the day there will be very few or none urban lights that are switched on and thus can be detected on the image and during the night the light is low making the straight lines barely detectable on the image taken at night and thus very few straight lines will be detected (refer to FIG. 1 and FIG. 2). Furthermore, since the urban lights 2T and straight lines 1T are extracted from the same image or from the same set of images their position relative to each other is correct (or can comprise a small error associated with the algorithms used to extract such visual features from the image or set of images).

The robot can proceed by estimating its position. Since the mobile robot, due to relatively good light conditions at twilight, was able to extract the straight lines 1T, by comparing them to the day-time map data the robot can comprise or have access to, it can estimate a correct self-position. In other words, the day-time map data can comprise the day-time straight lines 1. Comparing the straight lines 1T extracted from the twilight image with the straight lines 1 comprised in the day-time map, many similarities can be found (due to the fact that they comprise similar features as explained above), which results in a good estimate of the position of the mobile robot. Since the estimated position of the mobile robot is accurate or comprise a very small error, the alignment of the day-time map data with the straight lines 1T and the urban lights 2 is accurate too (refer to FIG. 5). Thus, the mobile robot can update its map, with the visual features 2T, that is with the urban light 2T to generate a map comprising both straight lines and urban lights that are properly aligned with each other.

In another embodiment, the mobile robot can comprise or have access to map data that comprise night time visual features 2, such as the urban lights 2 and the night straight lines 1N. Such map data can also be referred as night time map. The mobile robot, using a similar method with the one described above can extend the night time map with day-time visual features 1 using visual features extracted from images taken during twilight.

In yet another embodiment, the mobile robot can comprise or have access to map data that do not comprise any visual features. Using a similar method described above the map can be extended with both day-time visual features 1 and night time visual features 2. The mobile robot can extract location related data from at least one further sensor, such as one or a combination of at least one GPS sensor, at least one dead-reckoning sensor, at least one accelerometer, at least one time of flight camera, at least one Lidar sensor. Using such sensors, the mobile robot can estimate its position in space at the moment at least one or a plurality of images were taken. Combining the location-related data with visual features extracted from the images the mobile robot can generate map data comprising visual features. If the images are taken during twilight the visual features can comprise urban lights 2 and straight lines 1. Thus, a map comprising day time and night time visual features is generated. Further in a refinement process the mobile robot can improve the estimation of its position, previously done using the upper mentioned further sensors, by using the new map and possibly arriving at a better estimate of its position and at the same time the visual features on the map can be realigned accordingly.

The generated map is advantageous, as the mobile robot can use only one map to localize irrespective of the light conditions. During good light conditions, the similarities between the visual features extracted from the captured images and the visual features comprised in the map will be high because of the similarity between the straight lines comprised in the both sets of visual features. During low light conditions, the similarities between the visual features extracted from the captured images and the visual features comprised in the map will be high because of the similarity between the urban lights comprised in the both sets of visual features.

Figure 5:
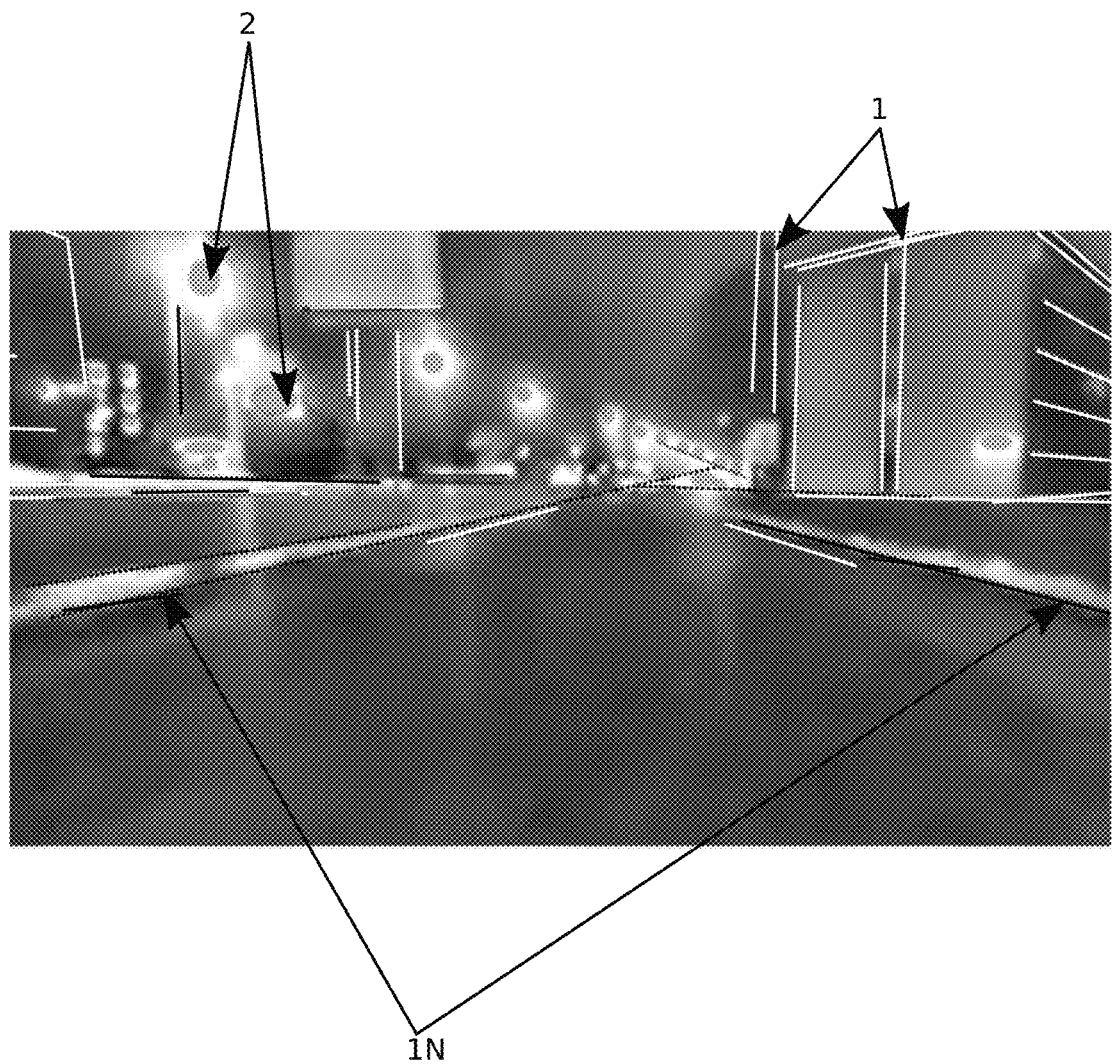
FIG. 5 shows an image with visual features extracted during day-time and with visual features extracted during night time using the visual features extracted from twilight time.

FIG. 5 shows an exemplary embodiment of an alignment according to the present invention of visual features extracted during day-time with visual features extracted during night time using the visual features extracted from twilight time. In FIG. 5 it can be seen that the day time map data and the night time map data are well aligned with each other. Thus, the mobile robot instead of comprising a plurality of maps referring to different times of the day can comprise only one merged map that can be used irrespectively of the light conditions, be it during the day, evening, night or twilight.

Embodiments of the present invention will now be described with further reference to FIGS. 6 to 12.

Figure 6:
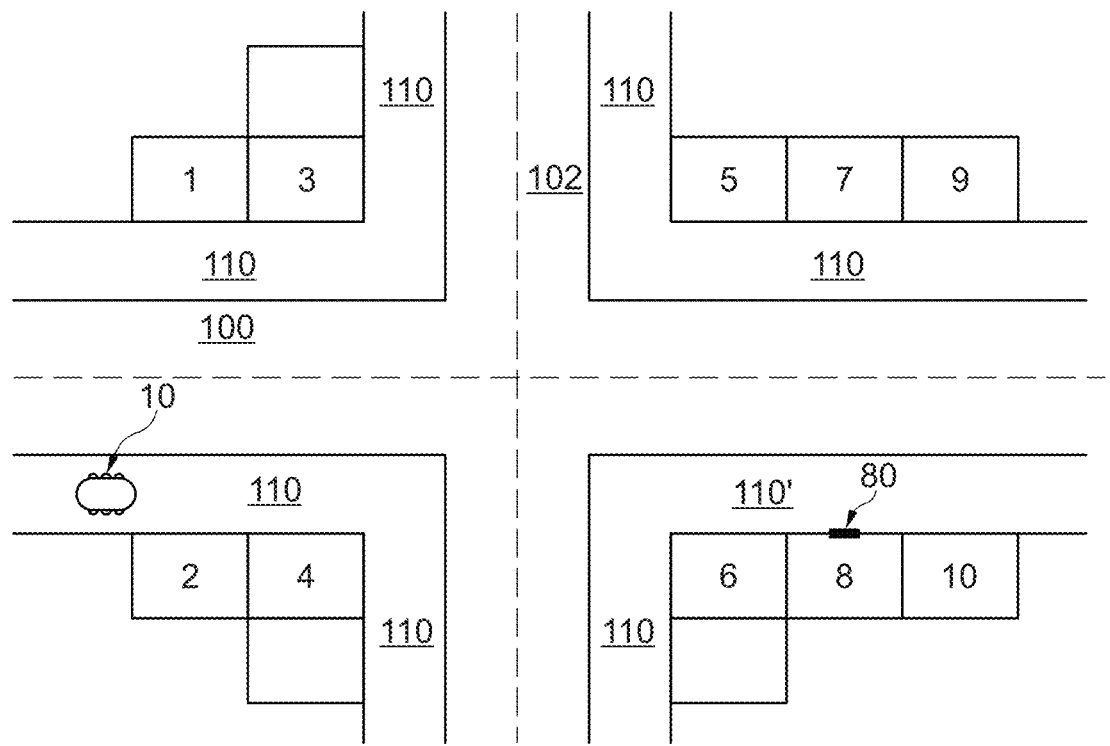
FIG. 6 depicts a robot operating in an environment comprising roads and sidewalks.

FIG. 6 depicts the situation where a mobile robot 10 is travelling in a real-world environment. The real-world environment comprises two roads 100, 102 that cross at an intersection. Next to the roads 100, 102, there may be provided sidewalks 110, and the robot 10 may typically travel on the sidewalks 110. The sidewalks 110 may be located between the roads 100, 102 and houses, which houses are identified by respective numbers 1 to 10 in FIG. 6. The robot 10 may be intended to "ship" or deliver a delivery to a particular house, such as to house 8. More particularly, in the situation depicted in FIG. 6, the robot 10 may be intended to deliver a delivery at a door 80 of house number 8.

To do so, the robot 10 has to "know" when it is at the right location, i.e., in front of house number 8. For doing that, the robot 10 may be equipped or, more generally, may have access to a map, i.e., to a 2-dimensional or 3-dimensional representation of the environment the robot 10 is travelling in.

To localize itself on the map, the robot 10 has to sense some characteristics or features of its surroundings. Such features or characteristics may then be used to determine the robot's location on a map.

Figure 7:
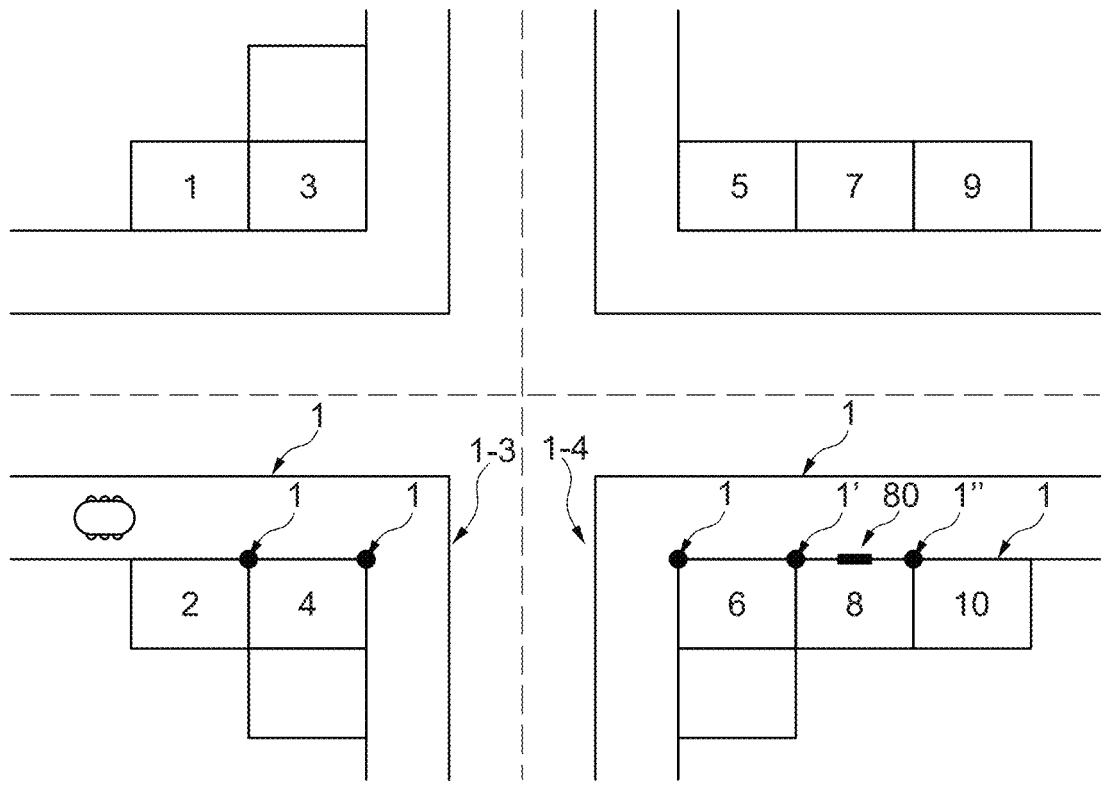
FIG. 7 depicts the environment of FIG. 6 with daytime features that may be extracted from images captured during day time.

As discussed, during daytime, the robot 10 may be configured to capture images and to derive daytime features from these images. As further discussed, these daytime features may in particular comprise straight lines 1, as is depicted in FIG. 7. It is noted that some lines 1 in FIG. 7 are depicted as dots. However, the skilled person will understand that the dots 1 in FIG. 7 represent vertical straight lines. Generally speaking, during daytime, the robot 10 may be configured to extract such straight lines 1 (or, more generally, day time features) from the images it captures.

Figure 8:
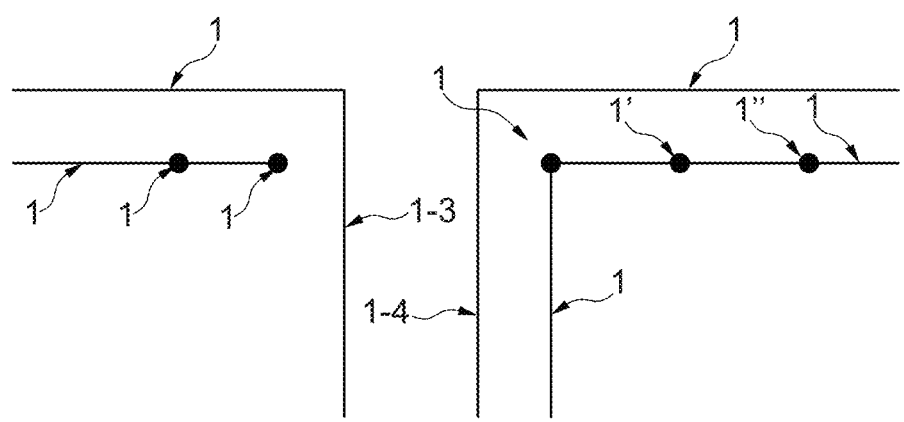
FIG. 8 depicts the daytime features captured in FIG. 7.
Figure 9:
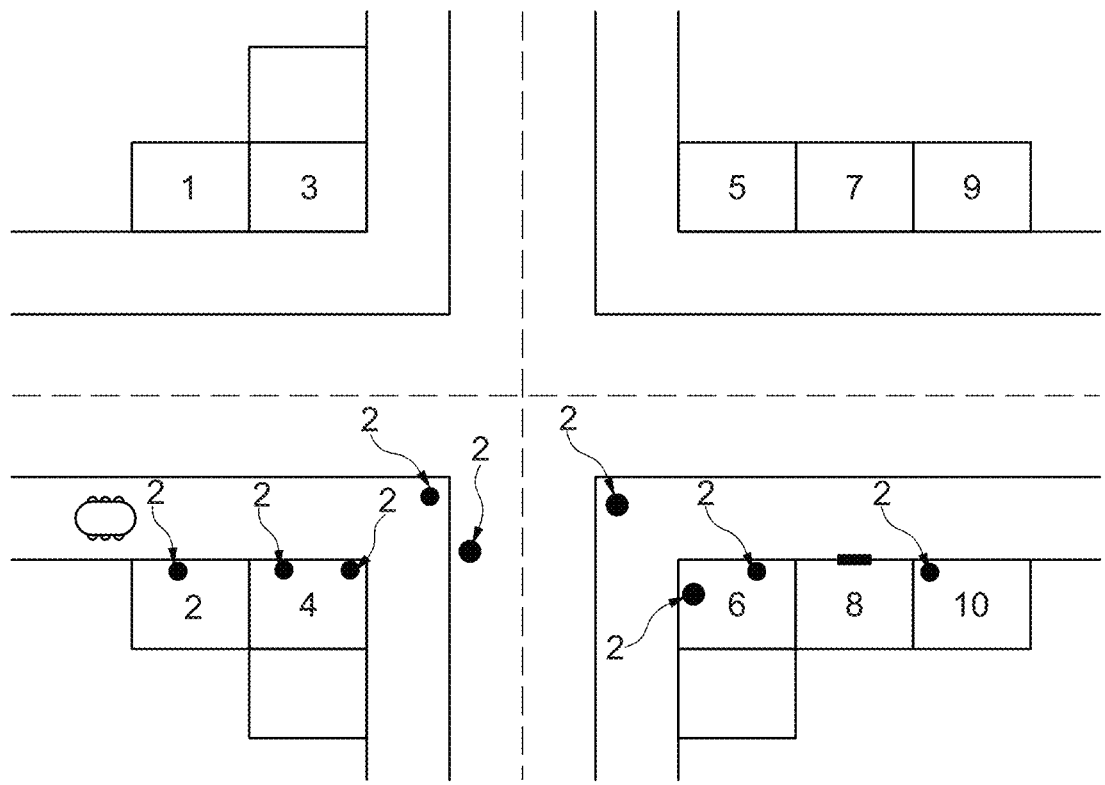
FIG. 9 depicts the environment of FIG. 6 with night time features that may be extracted from images captured during night time.

The features that the robot 10 can extract at daytime, i.e., the daytime features 1, are also depicted in FIG. 8. This figure essentially depicts which information the robot 10 can extract directly from the images it obtains.

However, it will be understood that this information extracted from the images is not yet sufficient for the robot to perform its delivery and to operate. To perform deliveries and to operate safely, the robot 10 has to be equipped with additional information. Such additional information can be a "map". The map comprises additional information (e.g., on roads, road crossings, houses, and doors of houses) and their positions relative to the daytime features 1. That is, such a map may comprise all the information depicted in FIG. 7. Thus, when intending to deliver a delivery at door 80 of house 8, the robot 10 "knows" that it needs to position itself between daytime features 1' and 1". Furthermore, with the additional map data, the robot 10 also "knows" that there is a road between daytime features 1-3 and 1-4.

Figure 10:
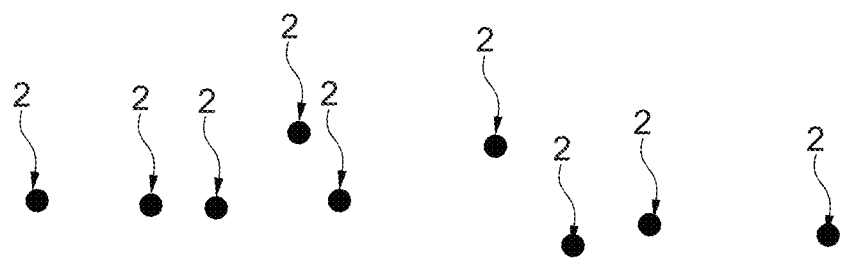
FIG. 10 depicts the night time features captured in FIG. 9.

However, when the robot 10 travels during the night, or, more generally, at low light conditions, it may no longer be possible to detect the daytime features 1. Instead—see FIG. 9—the robot 10 may be able to extract night time features 2 from the images of the surrounding of the robot 10. As discussed, such night time features 2 may in particular be artificial light sources, such as street lights, illuminated windows, and traffic lights. That is, at night time, the robot 10 is able to extract the night time features 2 directly from the images the robot 10 captures—that is depicted in FIG. 10.

To be able to use the night time features 2 for a localization of the robot 10, additional features need to be added to the map comprising the night time features 2. In principle, it would be possible to add additional features to the "skeleton" night time map depicted in FIG. 10. That is, one could add the relative location of the roads, the sidewalks, the houses and doors to the houses to the skeleton map depicted in FIG. 10. Thus, one would arrive at a night time map that could be used for localizing the robot 10 at night time.

However, it will be understood that this would result in substantial mapping effort. That is, to enable the robot 10 to operate both at day time and at night time, one would need to create two maps, one for daytime operation and one for night time operation.

However, embodiments of the present invention lower the mapping effort by "merging" these maps.

The starting point of such embodiments may be a day time map, i.e., a map comprising features that are visible during daytime (also referred to as daytime features 1) and additional information, such as information on roads, road crossings, traffic lights, houses, and doors. That is a map similar or identical to the one depicted in FIG. 7. One aim of embodiments of the present invention is to equip such a map with night time features 2. If the location or position of such night time features 2 was known relative to at least some of the daylight features 1, one could also determine the relative location or position of such night time features 2 relative to the additional information.

Figure 11:
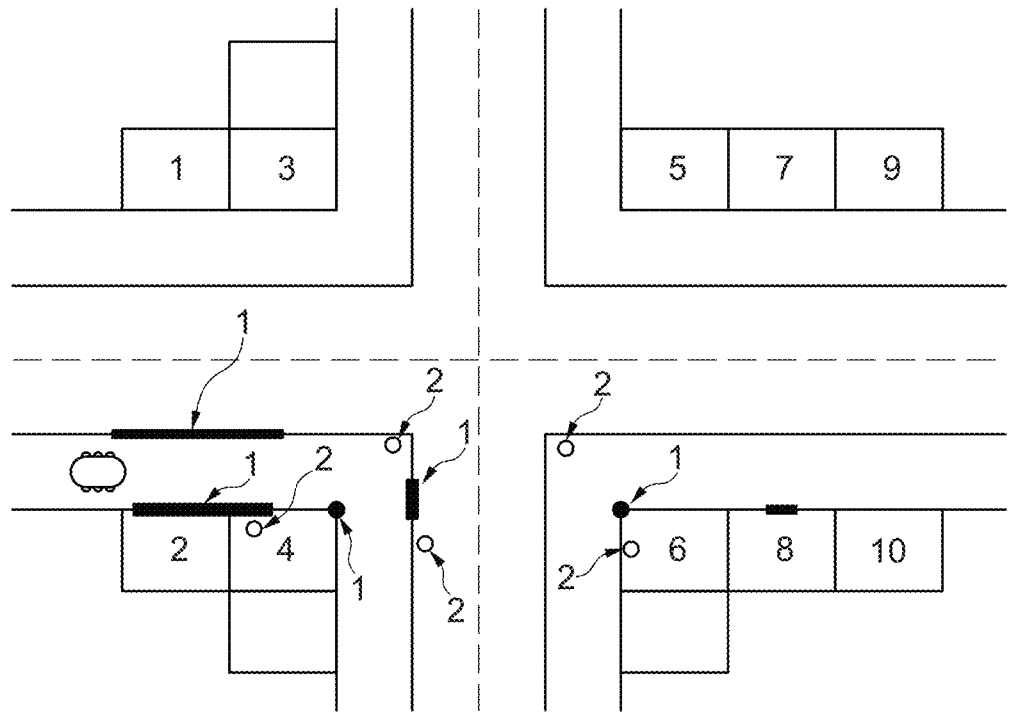
FIG. 11 depicts daytime features and night time features captured during twilight.
Figure 12:
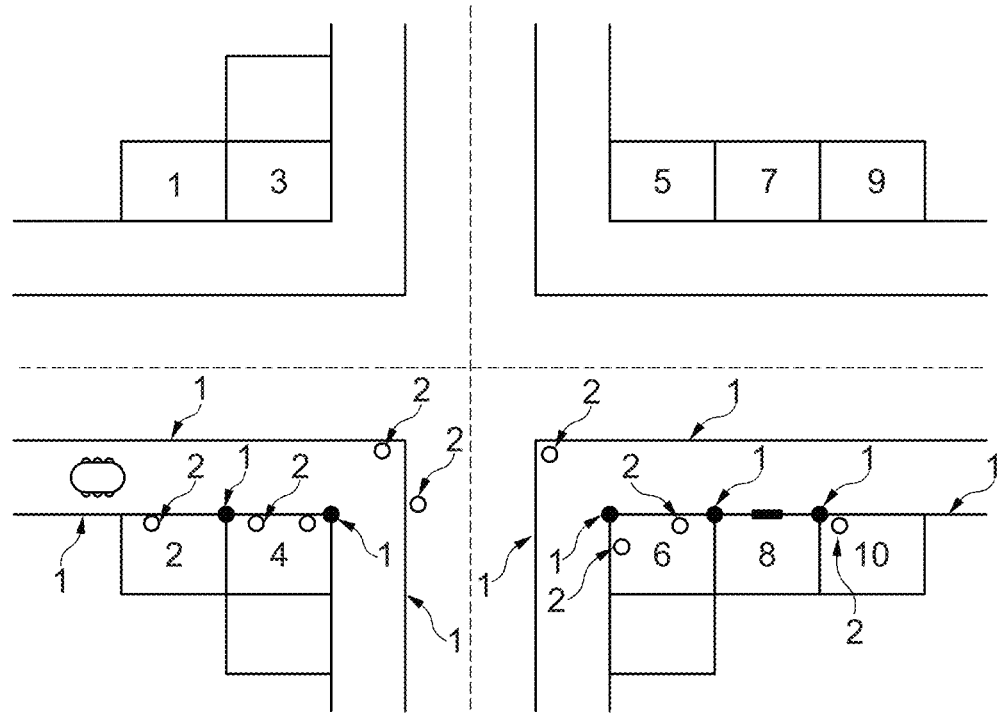
FIG. 12 depicts a map comprising both daytime features and night time features.

To achieve that, images are also captured at twilight, as is depicted in FIG. 11. As discussed, during twilight, at least some of the daytime features 1 and at least some of the night time features 2 may be visible and detectable by the robot 10. This allows the positions of the night time features 2 to be determined relative to the position of the day time features 1, and thus, also relative to the additional information.

One may thus arrive at a map that can be used both during daytime and night time with less mapping effort than would be necessary if not "merging" the maps. Such a map comprising all daytime features 1 and all night-time features 2 is also exemplarily depicted in FIG. 12.

However, it will be understood that the starting point of such embodiments may also be a night time map, i.e., a map comprising features that are visible during night time (also referred to as night time features 2) and additional information, such as information on roads, road crossings, traffic lights, houses, and doors. That is a map similar or identical to the one depicted in FIG. 9. One aim of embodiments of the present invention is to equip such a map with day time features 1. If the location or position of such daytime features 1 was known relative to at least some of the night time features 2, one could also determine the relative location or position of such daytime features 1 relative to the additional information.

The starting point of such embodiments may also be map without visual features, i.e. without daytime features 1 and night time features 2, comprising only additional information, such as information on roads, road crossings, traffic lights, houses, and doors. One aim of embodiments of the present invention is to equip such a map with visual features.

For this, the determination of the relative location or position of the visual features, i.e. daytime features 1 and night time features 2 with the additional information may be advantageous. In some embodiments, at least one or any combination of at least one GPS sensor, at least one dead-reckoning sensor, at least one accelerometer, at least one gyroscope, at least one time of flight camera (TOF), at least one LIDAR sensor, at least one odometer, at least one magnetometer, and at least one altitude sensor can be used to facilitate the determination of the relative the visual features, i.e. daytime features 1 and night time features 2 with the additional information. That is, the mobile robot can localize itself on the provided map, more specifically, the mobile robot can be configured to determine the location while (or after or before) capturing an image. For example, the mobile robot can use at least one of the upper mentioned sensors. Or in another example, an operator can determine the location were the images are captured from. Further, visual features can be extracted from the images. Such visual features can comprise daytime features and/or night time features. If the location or position of such visual features was known relative to at least some of the additional information on the map, one could add such visual features to the map.

In general, the order of addition of daytime features and night time features to a map is not a necessity and there might not even be an order, as the daytime features, the night time features can be added together simultaneously to a map. Additionally or alternatively, the map wherein the visual features can be added can comprise any type of visual features, or may not comprise visual features at all.

That is, the embodiment described above in conjunction with FIGS. 6 to 12 describes the creation of combined maps by first creating the day map and then adding night time features to it. However, it will be understood that this may also be done the other way around: first create night map and then add day time features. Generally, one or more robots may drive in different places and at different times and make a map from each individual drive. Some of these maps partially overlap some other maps. Then all of such maps of one area may be merged together, to thus create a master map where each small part of the map includes features from the constituent maps' features at that location. Adding another drive to such a master map does not just add more localization features, it will "bend and stretch" the map in a general way, e.g., as some distances between features may be adjusted in view of a new mapping drive.

Put differently, the order of addition is not a necessity and one may first generate the daytime map and then add night-time features to it or vice versa. Further, one may also start with an "empty" map (i.e., not comprising any daytime features or night-time features) and then successively add such features to the map.

It will be understood that it is also possible to first create a twilight map (i.e., a map that includes twilight features, which typically include day and night features) and then adding either further day features, night features or both. That is, first, features that are visible during twilight (such as some straight lines that may also be visible during the day and some artificial light sources that are also visible during the night) may be added to the map, and their relative position may be determined, and this map may then later be equipped with further day features (e.g., straight lines) and/or night-time features (e.g., artificial light sources).

In other words, one may add any map to any other map as long as there is sufficient overlap between the maps to properly align them, and the present technology is directed to create an overlap of day maps and night maps by using mapping during twilight.

FIGS. 13(a)-13(f) illustrate an embodiment of the present invention configured for matching night-time features 2 between multiple images of the same environment. While this Figure relates to matching feature in different images (e.g., in different frames), it should be understood that corresponding methods can also be employed when mapping features (i.e., determining their location to put the location on a map) or when matching features in images with features on a map (i.e., localizing the features and thus a position of, e.g., a robot capturing the images). Furthermore, while FIGS. 13(a)-13(f) primarily are described with regard to night-time features, it should be understood that the described methods are independent of that and that they may also be employed with other features.

As discussed, for mapping light sources and/or performing localization based on night-time features 2, the robot 10 may capture multiple images. Furthermore, night-time features 2 can be extracted from the captured images. The extracted night-time features 2 mostly belong to certain physical objects, such as, light-sources 2 (as they may be fairly distinguishable during low light conditions). Furthermore, night-time features 2 from multiple images (of the same environment) may belong to the same physical object and thus it is advantageous to match them.

The different images or frames of the same environment may be obtained by different cameras of the same mobile robot 10, by the same camera but on different times and/or poses of the mobile robot 10, by the same mobile robot 10, but on different passes of the robot on the environment, or by different mobile robots 10 passing on the environment. In general, the different images of the same environment may not be identical (though they may comprise visual features of the same physical objects). Hence, matching the extracted visual features of these images may not be straightforward.

Similarly, for localizing the mobile robot 10 and/or determining the position of the detected physical objects (i.e., for mapping the objects), it may be advantageous to perform a matching between the visual features extracted from at least one image captured by the camera(s) of the robot 10 and visual features comprised in a map of the environment that the robot 10 may comprise or have access to. As the data obtained by the cameras and/or other sensors and the data comprised in the map may comprise certain errors, matching of the visual features between different sets of data may be challenging.

For sake of brevity, only the matching of night-time features 2 among different images and only localization based on the night time features 2 is discussed. However, it should be understood that the same discussion is also valid if the day-time features 1 are used instead. Furthermore, a method for matching and localizing based on day-time features 1 (referred there as straight lines) is provided in the patent applications WO2017076928A1 and WO2017076929A1. A similar method as discussed in the aforementioned patent applications can be employed if night-time features 2, such as, light sources 2, are used for mapping and localization.

It should be further noticed, that the algorithm for mapping and localizing based on night-time features 2, will be illustrated visually. However, the algorithm can be configured to operate on quantified data and parameters.

Figure 13A:
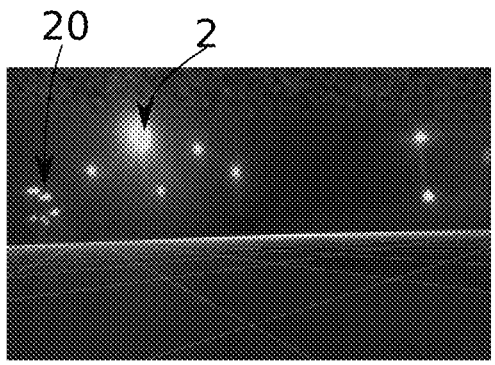
FIGS. 13(a)-13(f) illustrates a method configured for matching night-time features extracted from multiple images.
Figure 13B:
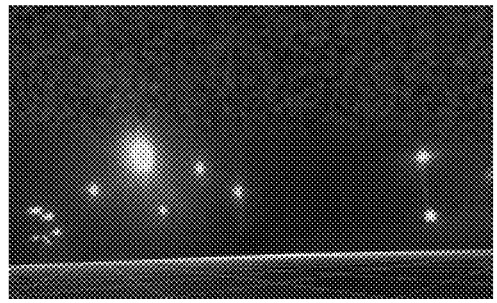
Figure 13C:
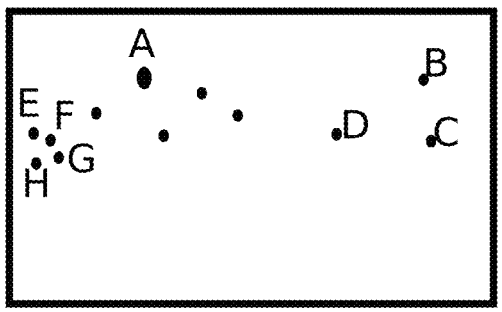

FIGS. 13(a) and 13(b) depict two different images captured on the same environment at low light conditions. The light sources can be particularly visible and distinguishable on an image captured at low light conditions and thus, the night-time features 2 can be extracted from the images. The extracted night-time features 2 are depicted in FIG. 13(c) (corresponding to the image of FIGS. 13(a)) and 13(d) (corresponding to the image of FIG. 13(b)). The visual features extracted from the image of FIG. 13(a) are depicted as filled round shapes and the visual features extracted from the image of FIG. 13(b) are depicted as empty round shapes, for better distinguishability between the two. Further, the frames of the images are depicted for better illustration. Further still, only some of the extracted night-time features 2 are annotated with characters A, B, C, D, E, F, G, H, A', B', C'. The annotated night-time features 2 will be used to illustrate the matching of the night-time features 2 between different images (or frames). It should be noted that the matching of the night-time features 2 can be performed on all or any number of the night-time features 2 (that is, not necessarily only on the night-time features 2 selected and annotated for illustration). Further, it can be understood that the pairs A and A', B and B', C and C', E and E', F and F', G and G' and H and H' belong to the same physical object (i.e. to the same light source).

Figure 13D:
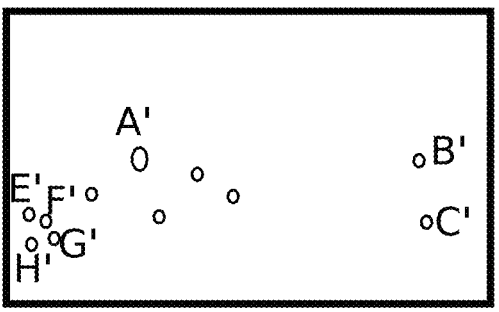

In other words, a first set of night-time features 2, depicted in FIG. 13(c) can be extracted from a first image (depicted in FIG. 13(a)) and second set of night-time features 2, depicted in FIG. 13(d), can be extracted from a second image (depicted in FIG. 13(b)). Some features detected on both images may correspond to the same physical object (e.g. A and A'). On the other hand, some detected night-time features 2 may be artefacts (e.g. night-time feature D on FIG. 13(c)).

Figure 13E:
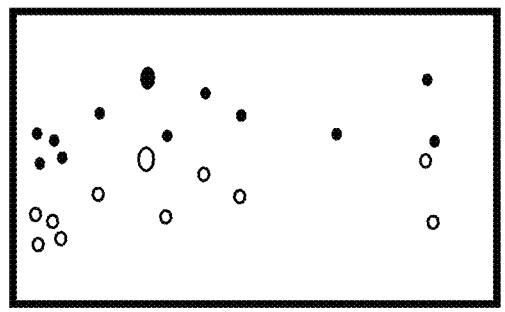

Though both images depict approximately the same environment (i.e. part of the physical objects they capture are the same), the two images are not identical to each other. For example, the focus of the first image is at a lower height than the focus of the second image. This can be caused because the images may have been captured at different times, from different robot poses, by different cameras, etc. Thus, as illustrated in FIG. 13(e), the matching of the night-time features 2, cannot be simply done by centering the images with each other.

The matching of night-time features 2 between the two images and their correspondence to a respective physical object can be performed by an iterative matching algorithm. The matching algorithm first calculates a matching of the night-time features 2, i.e. it calculates which night-time features 2 correspond to the same physical object or landmark. The matching can be done based on similarities between the night-time features 2, such as, size, position, color (of pixels representing the feature), brightness (of pixels representing the feature) and/or distance between the matched features. For example, an initial matching can be A with A', C with B'. The night-time features B and C' may be left un-matched (i.e. considered as unique features and thus unique light sources, on respective images).

Further, the algorithm assumes that the latest calculated matching of the night-time features 2 is correct. Based on this assumption, an optimizer algorithm is configured to reduce the error related to the matching between the night-time features 2 on different images. For this, a fitness function can be determined that quantifies the probability that a certain matching between the night-time features 2 correct. Then, the optimizer can adjust certain parameters of the fitness function in order to reduce the error of the matching. For example, the optimizer itself can be iterative. It can first calculate the direction of the solution, meaning it figures out that it has to increase some variables and decrease others to arrive at a better solution. It then makes a step in that direction. Then, in the next iteration, it figures out, which parameters now need to be increased and which to be decreased and makes another step. The optimizer also varies step size, so that when it gets very close to the optimal solution, it advances in small steps in order to not step over the optimum.

After the optimization step, the iterative matching algorithm may realize a further matching of the night-time features 2. On this further matching, the worst matchings from the previous iteration (e.g. matches that contribute the most on increasing the error according to the fitness function) can be removed and/or new matches may be added and/or matches may be rearranged. Then, the optimization algorithm is performed again on the new matching, and so on, until the optimum matching is found.

Figure 13F:
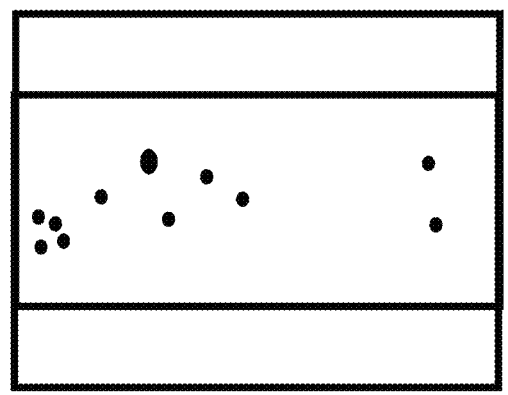

In the example depicted in the figure, the iterative matching algorithm may infer that the night-time features A and A', B and B', C and C', represent actual physical objects while night-time feature D is actually an artefact (as it is not present on the second image) and does not correspond to any physical object. The iterative matching algorithm may calculate the optimum matching, which in this example would comprise the matchings of A with A', B with B' and C with C', as depicted in FIG. 13(f). Further, the matching algorithm may calculate the number of landmarks or physical objects (such as, light sources) and may localize or improve a previous localization of the detected landmarks on an environment based on the night-time features 2 and/or predetermined robot pose and/or input from other sensors, such as, GPS, odometer, gyroscope and/or accelerometer.

The same algorithm can also be used for matching night-time features 2 extracted from an image (or extracted from multiple images and merged as described above), with map data. This can facilitate localization of the mobile robot. That is, after obtaining the night-time features 2 they can be compared with map data. In this case the map data are assumed to be comprised or accessible by the mobile robot and the map data comprise night-time features. Once a similarity is found between the map data and the extracted visual features, the mobile robot's location and pose can be estimated.

The comparison between the night-time features 2 and the map data can be performed as discussed above for the matching between night-time features 2 of multiple images. First the iterative matching algorithm performs an initial matching between night-time features 2 extracted from at least one image and night-time features in a map. Then the optimizer minimizes the errors done during the matching and so on, until the best matching is found. That is, the best map which maximizes the probability of obtaining the extracted night-time features 2 can be found. Based on the found map the position and orientation of the mobile robot 10 can be inferred.

However, further factors can affect matching a detected light to a mapped light. The position uncertainty of the light-source (i.e. physical objects) in the map (i.e. error in the map data) and the uncertainty about the robot location relative to the map should be considered. The latter is changing with each loop of optimization. That is, firstly non-clustered lights are matched and the robot location is optimized based on those matches. Thus, the robot location is known better at this stage (i.e. after matching and optimizing robot location based on non-clustered features). Further, the cluster threshold can be lowered and as a result fewer features are considered to be clustered (thus more features are considered during the optimization), and the optimizer can be executed again. After N steps, the cluster threshold might become zero, so the optimization of the robot location is performed based on all detected visual features. However, at this stage the currently known robot location is closer to the true one, hence the algorithm can converge faster.

In the above two processes (matching night-time features of different frames and matching night-time features extracted from at least one image with a map) the whole set of the extracted night-time features can be considered at once. That is, the matching is performed for all the extracted night-time features (though some of them may be discarded, e.g. night-time feature D). However, matching night-time features 2 that are close to each other can be more challenging than matching night-time features 2 that are distant—be it for matching night-time features 2 between different frames or night-time features extracted from at least one image with a map. Night-time features 2 that are close to each-other (i.e. having, in an image, a distance from each other below a threshold value, that may also be referred as cluster threshold) are referred as clusters of night-time features 20, or for simplicity clusters 20. For example, night-time features E, F, G and H form a cluster 20. Similarly, night-time features E', F', G' and H' form a cluster 20.

The threshold value (i.e. cluster threshold) to determine that certain night-time features 2 can be considered to form a cluster 20 can, for example, be represented in the form of pixel distance between the features in the images—i.e. a predefined distance in the image measured in pixels can be used to determine which night-time features 2 form a cluster 20. That is, if at least two night-time features 2 are closer to each other than a certain cluster threshold, these features are considered to form a cluster.

Alternatively or additionally, the angular distance between pairs of (night-time) features 2 can be used to determine which night-time features 2 form a cluster 20. The angular distance between two night-time features 2 can be measured by measuring the angle created between a first and a second vector (or segment, or line) comprising the same origin, wherein the first vector is directed towards the first (night-time) feature 2 and the second vector is directed towards the second (night-time) feature 2. The common origin of the first and the second vector can coincide with the center of the robot, or with the center of the camera, or with the origin of coordinate system that the mobile robot may utilize (e.g. for mapping, localization and/or navigation). For example, in an image captured by a front camera image, one feature (e.g., a light source) might be on the left of the image and its direction can be calculated to be 5 degrees left of the camera forward direction, whereas another feature (e.g., a light source) might be on the right side of the image and its direction can be calculated to be 8 degrees to the right of the camera forward direction. Then the angle between the two directions and features is 13 degrees.

In such embodiments, where the angular distance between pairs of night-time features 2 is used to determine which night-time features 2 form a cluster, the cluster threshold can be expressed as an angular distance threshold (e.g. in degrees or radians). Hence, if the angle between two night-time features 2 is lower than the cluster threshold angle, then the two night-time features 2 are considered to form a cluster 20.

That is, the clusters 20 can be detected based on the pixel distance on the image between the night-time features 2 and/or the angular distance between the night-time features, wherein cluster threshold is used, expressed in pixel distance and/or angle. Using the pixel distance between two night-time features 2 to determine if they form a cluster can be advantageous as it can be faster to calculate the pixel distance compared to the calculation of the angular distance. On the other hand, the angular distance can be more accurate, particularly when dealing with night-time features 2 extracted from images captured by different cameras. In such cases, the relative orientation between the two cameras can be used to infer the angular distance between night-time features 2 extracted from images captured by the different cameras. Furthermore, the calculation of the angular distance can also facilitate matching of night-time features 2 extracted from images of different cameras or the matching of light-sources captured from different cameras. For example, a rotating robot comprising front and side cameras can determine that a light-source that is visible in the front camera in a previous frame is the same light visible in the left camera in a next frame, based on the night-time features 2 extracted from the respective images and relative orientation between the front and the left camera and the angular distance of the night-time feature 2 (of the light source) on each image. For example, consider that in a first position, the angle between the night-time feature 2 of the light source in the image of the front camera and the forward direction of the front camera is 0°, and then the robot rotates 90° clockwise to a second position, and the night-time feature 2 of the same light-source is visible in the left camera in an angle of 0° from the forward direction of the left camera, wherein the forward directions of the front and the left camera are perpendicular. In such a scenario, the robot can infer the detected night-time features 2 belong to the same light-source (or physical object) using the measured angles.

To put it simply, the use of the angular distance can provide more accurate results not only for detecting clusters 20 but also for matching visual features extracted from images of different cameras, while on the other hand the use of pixel distance for detecting clusters can be faster and/or require less computational power. Furthermore, it can also be understood that when features only have a small difference in their angle, they will also be close together on an image, so that the pixel distance is approximately proportional to the angle difference, and may thus also provide acceptable results.

Other metrics for detecting clusters 20 can also be used (though they can be less useful compared to the pixel distance and angular distance, discussed above). For example, two night-time features 2 can be considered to form a cluster if the Euclidean distance in the real-world between the physical objects that night-time features 2 belong to is below a threshold value. This may require that the night-time feature are matched to respective physical objects and that the distance between the physical objects is known (for example, from a map of the physical objects). However, in some instances two physical objects may be far apart (in the third dimension not captured by the camera), but aligned (according to the view of the camera) and thus very hard to distinguish visually in an image. Hence, though the distance (in 3D) between the physical objects may be large (thus rendering them as not being part of a clusters) the distance between the respective visual features extracted from an image of the physical objects may be small (in the 2D camera images), which means that they should be considered as clusters.

The setting of the threshold value can be set manually, e.g. based on experiments or collected empirical data and determining which threshold value (or range of values) provide the best results or allow for a faster convergence of the matching of the night-time features 2 between different images or mapping. The threshold value can be set by taking into consideration the uncertainty (or error) during the visual feature detection, as the location of the visual can be determined up to a certain accuracy, mostly limited by the resolution of the cameras used to capture the images, but also by other factors (e.g. glare from light). The threshold value can further be set by taking into consideration the uncertainty of the sensors used for determining the robot poses (or movements), as the robot poses or movements are determined up to a certain accuracy based on the accuracy of the sensors used, such as, inertial measurement unit (IMU), odometer, gyroscope, GPS, etc.

When such clusters are present, the process of matching night-time features 2 can be performed in two stages. Firstly, the night-time features 2 that do not form a cluster 20 are matched. In the second stage the clusters 20 are also considered. However, during the second stage the iterative matching algorithm and the optimizer are closer to the optimal solution (as the distant night-time features 2 are already matched). Thus, the matching of the night-time features—be it for matching night-time features 2 between different frames or night-time features extracted from at least one image with a map—can be performed faster and more accurately at least compared to the case when all the night-time features 2 are considered at once.

That is, some embodiments of the present technology relate to generating a map (i.e., mapping) and further embodiments of the present technology relate to localizing a robot on such a map (i.e., localization). Both embodiments relating to mapping and embodiments relating to localization may utilize a two-stage process when utilizing clusters of features that are detected on images.

Again, with reference to FIGS. 13(a) and 13(c), such clusters of features may be clusters of light sources (see E, F, G, and H) on images captured at night time or during twilight. When features (e.g., A, B, C, D, E, F, G, H) are obtained and it is intended to add such features to a map (i.e., to determine their location and then use this location to put the features on the map), a two-stage process may be employed to determine the location of the features. In a first step, a first hypothesis for locations of the features A, B, C, D, E, F, G, H may be generated without taking into account the features E, F, G, H that are arranged in clusters. Again, features may be considered to be arranged in clusters, if, e.g., their distance on an image is below a threshold. Then, in a second step and based on the first hypothesis, a second hypothesis for the locations of the features A, B, C, D, E, F, G, H may be generated by now also taking into account the features E, F, G, H that are arranged in clusters.

This may be beneficial, e.g., for the following reasons: Generally, it may be relatively difficult to map clusters of features, as it may be more difficult to determine which pixel in an image corresponds to which feature if the features are relatively close to one another (i.e., if the features are arranged in a cluster). That is, mapping features in a cluster may be more prone to errors than mapping features that are not arranged in a cluster, i.e., isolated features. With the presently described embodiments, the first hypothesis for mapping the features in an image is created by not taking into account the features in clusters. Thus, a first hypothesis is created not taking into account the features that are likely to cause errors. However, these features (arranged in clusters) are then used in second step to refine a second hypothesis being more refined than the first hypothesis. By first creating a "coarse" first hypothesis and then refining it with the clustered features, one may arrive at a viable hypothesis for the location of the features (including the clustered features) a lot faster than would be possible if already considering the error-prone clustered features in the first step. Further, by also taking into account the clustered features, one arrives at a second hypothesis relating to the location of the features that is generally more valid than would be the case if completely ignoring the clustered features. Thus, the presently described embodiments allow a relatively exact mapping of features in a relatively short amount of time.

While in the above, a two-stage process for mapping has been described (creating a first hypothesis not taking into account clustered features and then creating a second hypothesis based on the first hypothesis and taking into account the clustered features), it should be understood that a corresponding two-stage process can also be employed for localization. That is, after capturing an image, in a first step, a first hypothesis for a location of a robot can be generated by taking into account the isolated features only (and not the clustered features), and in a second step, a second hypothesis for a location of the robot can be generated by taking into account the first hypothesis and also the clustered features. Again, this may have advantages corresponding to the advantages discussed above with regard to the two-stage mapping process, i.e., it may allow for a fast and reliable localization.

The presently described embodiments primarily relate to localization and mapping at night or during twilight, as in these light conditions, point features (such as light sources), including clustered point features are numerous. However, it will be understood that these embodiments are not limited to such light conditions and that the above described technology may also be employed during the day and in good light conditions.

Further, generally, embodiments of the present technology may assign different weights to features. This may particularly apply to localization and mapping, and the embodiment relating to localization will be discussed first. Exemplary reference can again be made to FIG. 13(c) depicting different features A to G identified on an image. When localizing the robot capturing the respective image, the features A to G need to be matched to respective features that are present on a map. In embodiments of the present technology, different weights may be assigned to different features, e.g., feature B may be assigned a weight greater than feature A in the matching process. Generally, the more isolated a feature is (e.g., the lower the number of other features in its vicinity), the greater the weight that is assigned to this feature in the matching process. Again, isolated features may be more reliably matched so that it may be advantageous to assign higher weights to more isolated features to arrive at reliable results. While FIG. 13(c) only depicts light sources as features, it will be understood that this embodiment may be employed independent of the exact features used, i.e., it may also be employed, e.g., with line segments as features.

Further, this embodiment may also be employed for mapping. When mapping features, their location needs to be determined. Also in this step of determining the location of a feature, embodiments of the present technology may assign different weights to features. E.g., for mapping the location of features A in FIG. 13(c), all the features A to G may be taken into consideration with different weights, the different weights again depending on the level of isolation of a feature (and generally assigning a higher weight to more isolated features). Again, this may have the benefits discussed before.

That is, during mapping of features and localization based on features, clustered features may be assigned a smaller weight compared to isolated features. Again, as discussed above, the clustered features and isolated featured may be differentiated based on a cluster threshold. The weight assignment to the features can thus allow for a de-prioritization of clustered features, because, due to their closeness to each-other, it can be more challenging to match them unambiguously—i.e. determine which pixel on the image belong to which of the clustered features (during mapping of the features) and/or determine which physical object corresponds to which feature (during localization based on features). Thus, taking clustered and isolated features into account in the same manner may not be efficient, as the clustered features may introduce errors and may increase the time required for mapping and localization. On the other hand, not considering the clustered features at all may also not be efficient, as they may still provide further information for realizing an accurate mapping and localization. That is, observing features very close to each-other may still provide useful information, even if it can be challenging to determine which is which. Furthermore, even a wrongly matched feature, e.g. a feature matched to another close feature within a cluster, may still facilitate finding the optimum solution (i.e. a correct mapping of the features or a correct determination of a location based on the features). That is, as clustered features are close to each-other, the error performed when wrongly matching them is small, hence they may positively contribute into finding the optimum matching.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

I claim:

1. A method comprising:
   generating a map comprising daytime features and nighttime features,
   wherein a position of nighttime features relative to the daytime features is determined by at least one image captured during twilight,
   the method further comprising:
   capturing the at least one image during twilight and extracting twilight visual features from the at least one image captured during twilight, wherein the twilight visual features comprise twilight straight lines and/or twilight urban lights,
   finding at least one commonality between the twilight straight lines and the daytime features;
   aligning the twilight visual features with daytime features using the at least one commonality between the twilight straight lines and the daytime features;
   finding at least one commonality between the twilight urban lights and the nighttime features;
   aligning twilight visual features with nighttime features using the at least one commonality between the twilight urban lights and the nighttime features; and
   aligning at least one of the twilight visual features with (i) at least one daytime feature that is not present in the twilight image, and/or (ii) at least one nighttime feature that is not present in the twilight image.

2. A method according to claim 1, wherein the map comprising daytime features and nighttime features is generated by adding to a provided map any of: twilight visual features; nighttime features; and daytime features.

3. A method according to claim 1, wherein visual features related to a location are added to the map by capturing at least one image on the location; extracting visual features from the at least one image; estimating the location and associating the location to the visual features; and adding the visual features associated with respective location to the map.

4. A method according to claim 3, wherein estimation of the location is facilitated by comparing visual features extracted from at least one image captured on the location with visual features comprised by the map used to estimate the location.

5. A method according to claim 3, wherein estimation of the location during daytime is facilitated by daytime features.

6. A method according to claim 3, wherein estimation of the location during low light conditions is facilitated by nighttime features.

7. A method according to claim 3, wherein the estimation of the location is facilitated by at least one or any combination of: at least one GPS sensor, at least one dead-reckoning sensor, at least one accelerometer, at least one gyroscope, at least one time of flight camera, at least one Lidar sensor, at least one odometer, at least one magnetometer, and at least one altitude sensor.

8. A method according to claim 1, wherein the daytime features comprise a plurality of straight lines.

9. A method according to claim 1, wherein the nighttime features comprise urban lights.

10. A method according to claim 1, wherein the method is used as a Simultaneous Localization and Mapping (SLAM) method.

11. A method according to claim 1, wherein twilight is defined by the sun being located between 0° and 18° below the horizon, preferably between 0° and 12° below the horizon, such as between 0° and 6° below the horizon.

12. A method according to claim 11, wherein twilight is defined by the sun being located between 0° and 12° below the horizon.

13. A method according to claim 12, wherein twilight is defined by the sun being located between 0° and 6° below the horizon.

14. A processing unit comprising one or more processors, and at least one memory, configured to execute the method of claim 1.

15. The processing unit of claim 14, wherein the processing unit is part of a mobile robot and facilitates the mobile robot's navigation and localization.

16. The method of claim 1, wherein, after the aligning, forming the map by then merging aligned features.

17. A system, comprising: one or more processors; and at least one non-transitory computer-readable storage medium having instructions stored thereupon which, when executed by the one or more processors, cause the one or more processors to perform operations comprising: the method of claim 1.

18. The system of claim 17 wherein the one or more processors comprise a processing unit.

19. A method comprising:
- obtaining (i) at least one daytime image captured during daylight and comprising one or more daytime features, (ii) at least one nighttime image captured during nighttime and comprising one or more nighttime features, and (iii) at least one twilight image captured during twilight, said at least one twilight image comprising one or more twilight visual features;
- generating a map comprising at least some of said one or more daytime features and at least some of said one or more nighttime features, said generating comprising:
- determining a position of a nighttime feature of said one or more nighttime features relative to a daytime feature of said one or more daytime features based on at least some of said one or more twilight visual features;
- finding at least one commonality between the twilight straight lines and the daytime features;
- aligning one or more of the twilight visual features with one or more of the daytime features in the map based on the at least one commonality between one or more twilight straight lines and the daytime features;
- finding at least one commonality between the twilight urban lights and the nighttime features;
- aligning one or more of the twilight visual features with the one or more nighttime features in the map based on at least one commonality between one or more twilight urban lights and the nighttime features; and
- determining alignment in the map of: (i) at least one daytime feature and/or (ii) at least one nighttime feature that was not present in the at least one image captured at twilight.

20. A method comprising:
- extracting twilight visual features from at least one twilight image captured during twilight, wherein the twilight visual features comprise twilight straight lines and/or twilight urban lights;
- extracting daytime features from at least one day image captured during the day;
- extracting nighttime features from at least one nighttime image captured at night; and
- generating a map comprising at least some of said daytime features and at least some of said nighttime features, said generating comprising:
- determining a position in said map of nighttime features relative to the daytime features based on the extracted twilight visual features,
- finding at least one commonality between the twilight straight lines and the daytime features,
- aligning the twilight visual features with daytime features in the map using the at least one commonality between the twilight straight lines and the daytime features,
- finding at least one commonality between the twilight urban lights and the nighttime features,
- aligning twilight visual features with nighttime features in the map using the at least one commonality between the twilight urban lights and the nighttime features,
- determining at least one alignment between a twilight visual feature and a feature in the map based on a feature not present in the twilight visual features.

\* \* \* \* \*